(12) United States Patent
Sasagawa et al.

(10) Patent No.: US 11,813,783 B2
(45) Date of Patent: Nov. 14, 2023

(54) INJECTION MOLDING SYSTEM AND METHOD FOR MANUFACTURING MOLDED OBJECT

(71) Applicant: SEIKO EPSON CORPORATION, Tokyo (JP)

(72) Inventors: Kakeru Sasagawa, Nagano (JP); Kei Yokota, Nagano (JP); Kenta Anegawa, Nagano (JP); Seiichiro Yamashita, Nagano (JP); Yuji Shinbaru, Nagano (JP); Kazunobu Maruyama, Nagano (JP); Daichi Miyashita, Nagano (JP); Hiroki Takano, Nagano (JP); Riona Hayashi, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/023,482

(22) Filed: Sep. 17, 2020

(65) Prior Publication Data

US 2021/0086426 A1  Mar. 25, 2021

(30) Foreign Application Priority Data

Sep. 19, 2019  (JP) ................................. 2019-169954

(51) Int. Cl.
*B29C 45/76* (2006.01)
*B29C 45/42* (2006.01)
(Continued)

(52) U.S. Cl.
CPC ...... *B29C 45/7626* (2013.01); *B29C 45/1769* (2013.01); *B29C 45/42* (2013.01);
(Continued)

(58) Field of Classification Search
CPC .. B29C 45/7626; B29C 45/1769; B29C 45/42
See application file for complete search history.

(56) References Cited

U.S. PATENT DOCUMENTS 2,523,137 A * 9/1950 Nichols ................... B29C 45/03
                                                            425/158
6,322,343 B1 * 11/2001 Yoda ................... B29C 45/0084
                                                            425/144
(Continued)

FOREIGN PATENT DOCUMENTS

CN    107351309 A  * 11/2017 ............. B29C 45/14
JP    H06-015694 A    1/1994
(Continued)

OTHER PUBLICATIONS

Machine translation JP09123232A (Year: 1997).*
(Continued)

*Primary Examiner* — Matthew J Daniels
*Assistant Examiner* — Wayne K. Swier
(74) *Attorney, Agent, or Firm* — Global IP Counselors, LLP

(57) ABSTRACT

An injection molding system includes: an injection molding machine; an inspection device including a first placement unit, a second placement unit, an inspection unit, and a moving unit configured to change a relative position between the first placement unit and the inspection unit and a relative position between the second placement unit and the inspection unit; a third placement unit; a robot configured to convey the molded object; and a control device. The control device controls the injection molding machine, the robot, and the inspection device so as to mold a first molded object during a first molding period, inspect the first molded object placed on the first placement unit during a first inspection period, convey the first molded object after inspection from the first placement unit to the third placement unit during a first conveyance period, mold a second molded object during a second molding period, inspect the second molded object placed on the second placement unit during a second inspection period, convey the second (Continued)

molded object after inspection from the second placement unit to the third placement unit during a second conveyance period, and overlap the first inspection period and the second molding period and overlap the second inspection period and the first conveyance period.

6 Claims, 20 Drawing Sheets

(51) Int. Cl.
    *B29C 45/17*         (2006.01)
    *B29C 45/74*         (2006.01)
    *B29C 45/60*         (2006.01)
    *B29C 45/62*         (2006.01)
    *B29C 45/47*         (2006.01)

(52) U.S. Cl.
    CPC .............. *B29C 45/47* (2013.01); *B29C 45/60* (2013.01); *B29C 45/62* (2013.01); *B29C 45/74* (2013.01)

(56) References Cited

U.S. PATENT DOCUMENTS

| | | | | |
|---|---|---|---|---|
| 7,353,954 B1 * | 4/2008 | Malek | .................... | G02B 13/22 |
| | | | | 209/922 |
| 2005/0127571 A1 * | 6/2005 | Weinmann | .......... | B29C 45/7626 |
| | | | | 264/408 |
| 2016/0346979 A1 * | 12/2016 | Uchiyama | ........... | B29C 45/7686 |
| 2017/0136671 A1 | 5/2017 | Uchiyama | | |
| 2019/0358903 A1 * | 11/2019 | Watanabe | ............. | B29C 64/314 |

FOREIGN PATENT DOCUMENTS

| | | | | | |
|---|---|---|---|---|---|
| JP | H07-205184 A | | 8/1995 | | |
| JP | 09123232 A | * | 5/1997 | ......... | B29C 45/1769 |
| JP | 2003127189 A | * | 5/2003 | ......... | B29C 45/1769 |
| JP | 2005-014224 A | | 1/2005 | | |
| JP | 2009-214438 A | | 9/2009 | | |
| JP | 2009214438 A | * | 9/2009 | ......... | B29C 45/1769 |
| JP | 2012-131115 A | | 7/2012 | | |
| JP | 2014-226846 A | | 12/2014 | | |
| JP | 2016-215557 A | | 12/2016 | | |
| JP | 2017-087689 A | | 5/2017 | | |

OTHER PUBLICATIONS

Machine translation JP200312789A (Year: 2003).*
Machine translation JP2009214438A (Year: 2009).*
Machine translation CN107351309A (Year: 2017).*

* cited by examiner

INJECTION MOLDING SYSTEM AND METHOD FOR MANUFACTURING MOLDED OBJECT

The present application is based on, and claims priority from JP Application Serial Number 2019-169954, filed Sep. 19, 2019, the disclosure of which is hereby incorporated by reference herein in its entirety.

BACKGROUND

1. Technical Field

The present disclosure relates to an injection molding system and a method for manufacturing a molded object.

2. Related Art

JP-A-2005-014224 discloses a device that takes out by a robot, a molded object molded by an injection molding machine from a mold, conveys the molded object to an inspection device, and conveys the molded object after inspection from the inspection device to a stage.

As in the device described above, in a device that inspects the molded object molded by the injection molding machine and conveys the molded object after the inspection, there is a possibility that a step of inspecting the molded object becomes a bottleneck, resulting in a longer cycle time. Therefore, there is room for further improvement in order to improve the cycle time.

SUMMARY

According to one aspect of the present disclosure, an injection molding system is provided. The injection molding system includes: an injection molding machine configured to inject a molten material into a mold to mold a molded object; an inspection device including a first placement unit and a second placement unit on which the molded object is placed, an inspection unit configured to inspect the molded object, and a moving unit configured to change a relative position between the first placement unit and the inspection unit and a relative position between the second placement unit and the inspection unit; a third placement unit on which the molded object after inspection by the inspection device is placed; a robot configured to execute an operation of conveying the molded object from the mold to the first placement unit or the second placement unit, and an operation of conveying the molded object from the first placement unit or the second placement unit to the third placement unit; and a control device configured to control the injection molding machine, the robot, and the inspection device. The control device controls the injection molding machine, the robot, and the inspection device so as to mold, by the injection molding machine, a first molded object as the molded object during a first molding period, inspect, by the inspection unit, the first molded object placed on the first placement unit during a first inspection period, convey, by the robot, the first molded object after inspection from the first placement unit to the third placement unit during a first conveyance period, mold, by the injection molding machine, a second molded object as the molded object during a second molding period after the first molding period, inspect, by the inspection unit, the second molded object placed on the second placement unit during a second inspection period, convey, by the robot, the second molded object after inspection from the second placement unit to the third placement unit during a second conveyance period, and overlap the first inspection period and the second molding period and overlap the second inspection period and the first conveyance period.

DESCRIPTION OF EXEMPLARY EMBODIMENTS

A. First Embodiment

Figure 1:
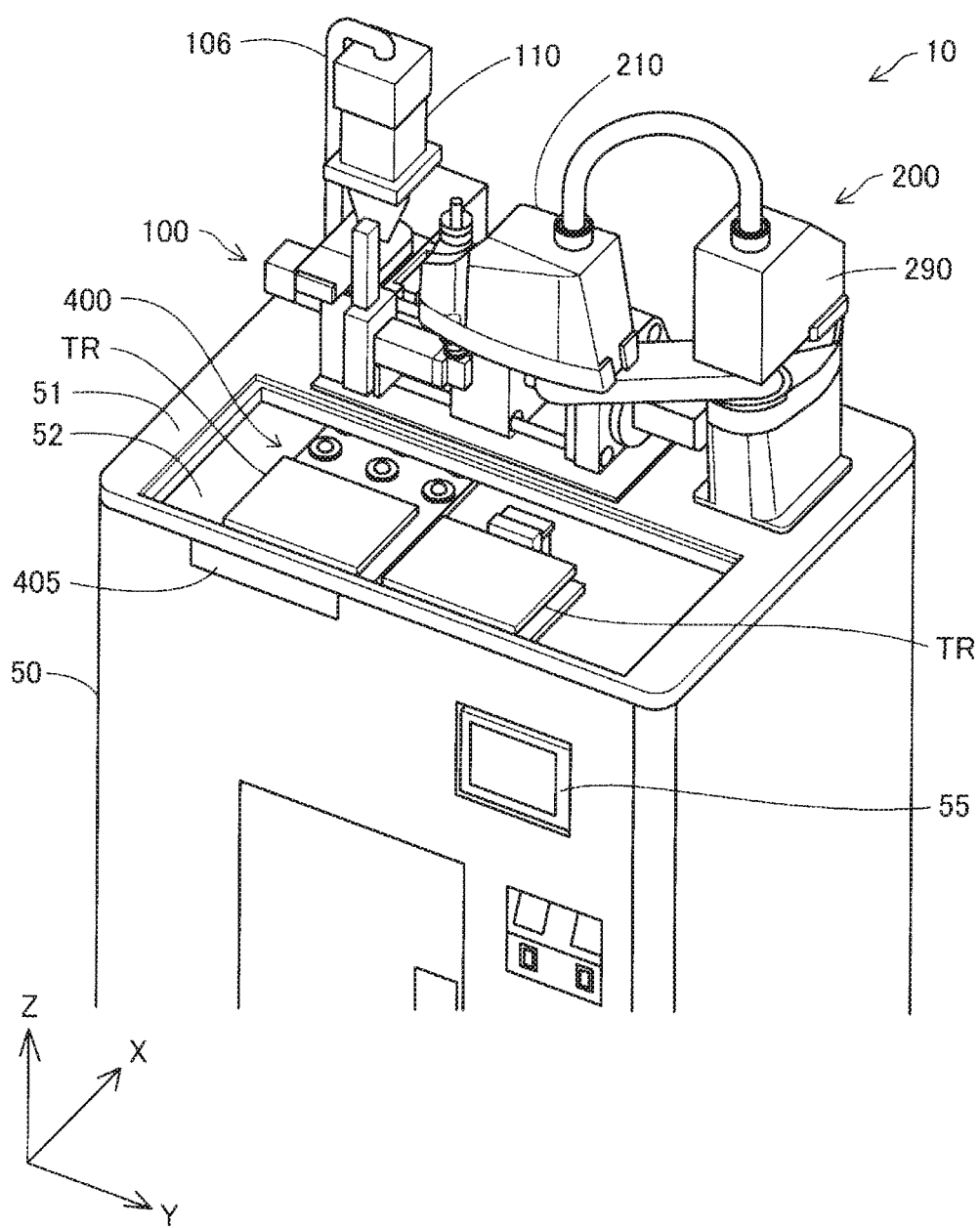
FIG. 1 is a first perspective view showing a schematic configuration of an injection molding system according to a first embodiment.
Figure 2:
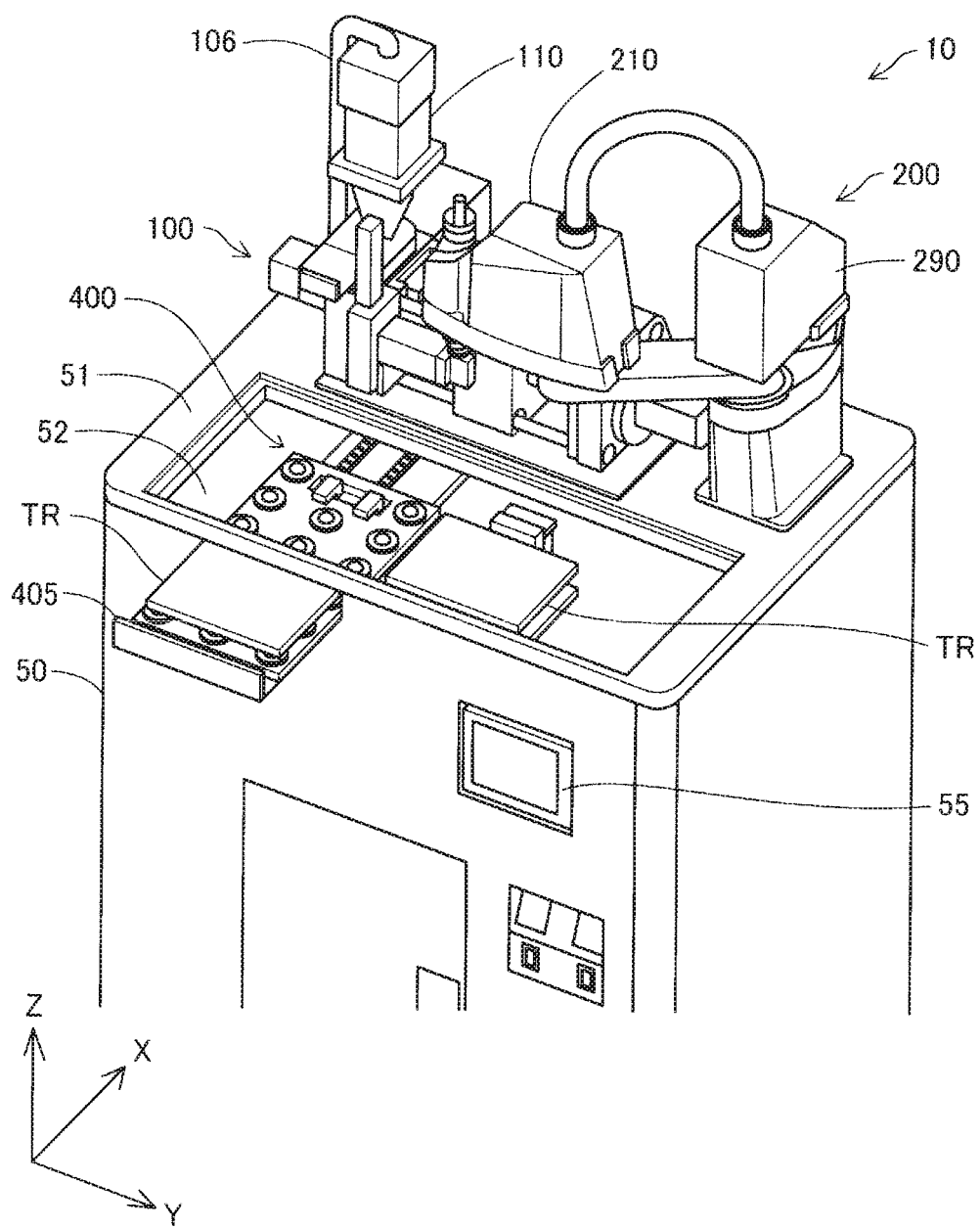
FIG. 2 is a second perspective view showing the schematic configuration of the injection molding system according to the first embodiment.
Figure 3:
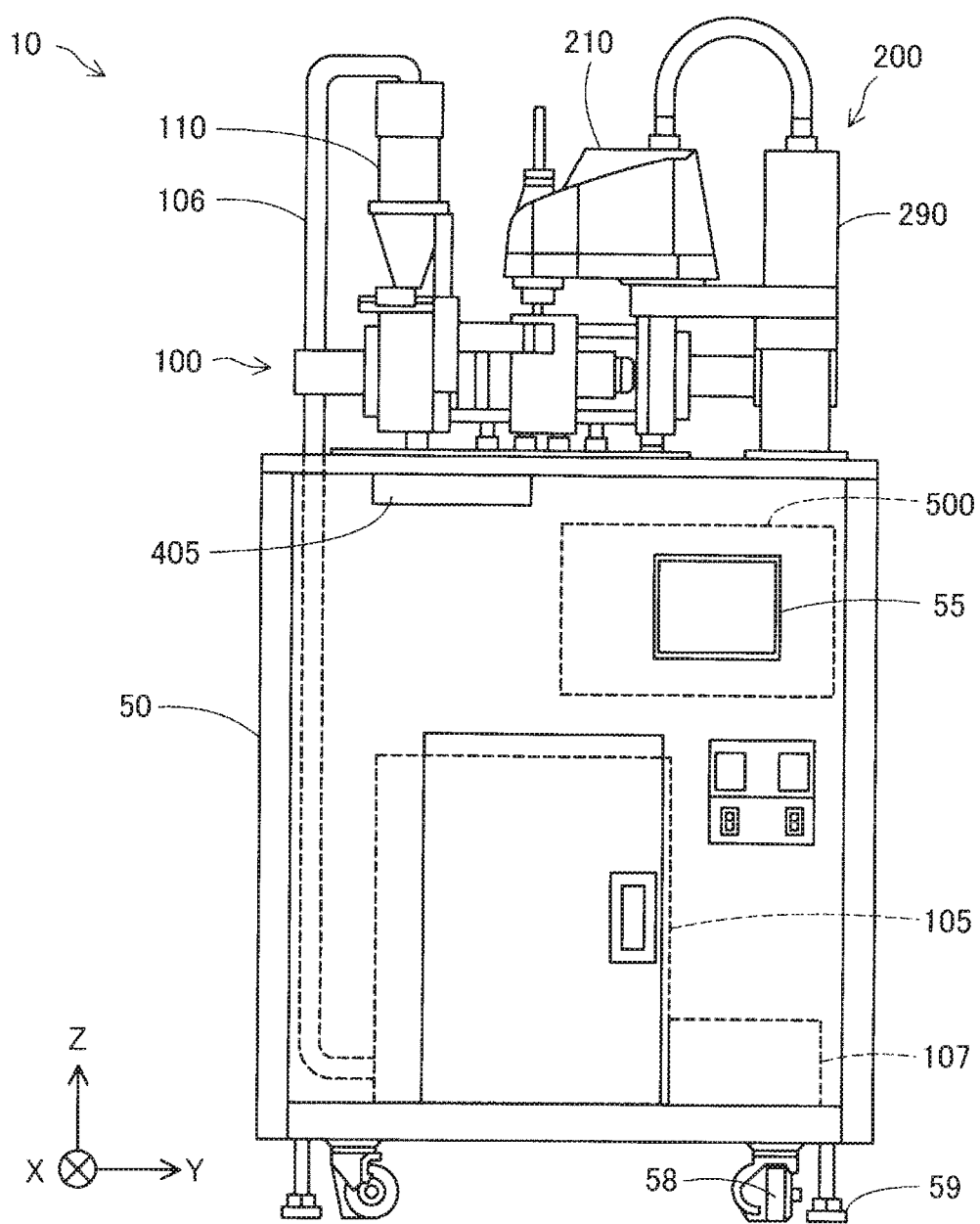
FIG. 3 is a front view showing a schematic configuration of the injection molding system according to the first embodiment.
Figure 4:
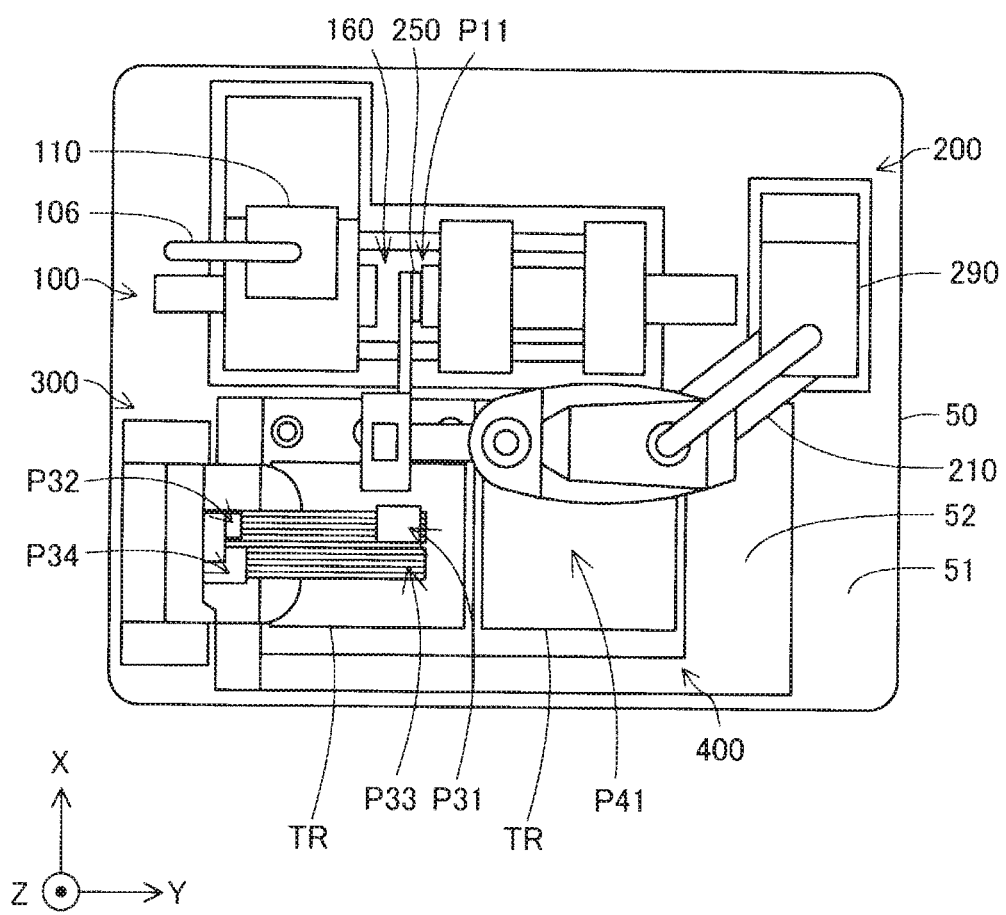
FIG. 4 is a top view showing the schematic configuration of the injection molding system according to the first embodiment.

FIG. 1 is a first perspective view showing a schematic configuration of an injection molding system 10 according to a first embodiment. FIG. 2 is a second perspective view showing the schematic configuration of the injection molding system 10 according to the first embodiment. FIG. 3 is a front view showing the schematic configuration of the injection molding system 10 according to the present embodiment. FIG. 4 is a top view showing the schematic configuration of the injection molding system 10 according to the present embodiment. In FIGS. 1 to 4, arrows along X, Y, and Z directions that are orthogonal to each other are shown. The X direction and the Y direction are directions along a horizontal direction, and the Z direction is a direction along a vertical direction. In other figures, arrows along the X, Y, and Z directions are appropriately shown. The X, Y, and Z directions in FIGS. 1 to 4 and the X, Y, and Z directions in other figures represent the same direction.

The injection molding system 10 according to the present embodiment includes an injection molding machine 100, a robot 200, an inspection device 300, a tray moving unit 400, and a control device 500, which are disposed in one housing 50. The housing 50 includes a first base 51 and a second base 52. The injection molding machine 100, the robot 200, and the inspection device 300 are disposed on an upper surface of the first base 51. The robot 200 is disposed on a +Y direction side with respect to the injection molding machine 100. The inspection device 300 is disposed on a –X direction side with respect to the injection molding machine 100. The first base 51 is provided with an opening portion. The second base 52 is provided below the first base 51. The tray moving unit 400 is disposed on an upper surface of the second base 52. The injection molding machine 100 is disposed above the tray moving unit 400 in a vertical direction. At least a part of the injection molding machine 100 vertically overlaps the tray moving unit 400. The inspection device 300 is disposed above the tray moving unit 400 in the vertical direction. At least a part of the inspection device 300 vertically overlaps the tray moving unit 400. A space between the first base 51 and the second base 52 communicates with a space above the first base 51 via an opening portion provided in the first base 51. The control device 500 is disposed below the second base 52. A caster 58 for moving the housing 50 and a stopper 59 for fixing the housing 50 are provided on a lower surface of the housing 50. An operation panel 55 is provided in a front portion of the housing 50. In the present embodiment, the operation panel 55 is implemented by a touch panel. In FIGS. 1 to 3, the inspection device 300 is not illustrated.

The tray moving unit 400 moves a tray TR for conveying a molded object. The tray moving unit 400 is provided with a tray discharging mechanism 405. As shown in FIG. 2, the tray discharging mechanism 405 protrudes toward the outside of the housing 50 to discharge the tray TR to the outside of the housing 50. A detailed configuration of the tray discharging mechanism 405 will be described later. The tray TR may be referred to as a third placement position.

As shown in FIG. 3, a material supply unit 105 is disposed below the second base 52 of the housing 50. A material in a state of pellets, powder, or the like is accommodated in the material supply unit 105. In the present embodiment, a pellet-shaped ABS resin is used as the material. The material supply unit 105 is coupled to a material storage unit 110 of the injection molding machine 100 via a material supply pipe 106. A compressor 107 is coupled to the material supply unit 105. The compressor 107 supplies compressed air to the material supply unit 105, and pumps a material from the material supply unit 105 to the material storage unit 110 via the material supply pipe 106. The compressor 107 is driven under control of the control device 500.

At a taking-out position P11 shown in FIG. 4, the robot 200 takes out the molded object from a mold unit 160 of the injection molding machine 100 to convey the molded object. In the present embodiment, the robot 200 includes an arm unit 210, a suction unit 250, and a robot control unit 290. The arm unit 210 moves a position of the suction unit 250. The arm unit 210 rotates a direction of the suction unit 250. The suction unit 250 sucks the molded object by vacuum suction. The robot control unit 290 is implemented by a computer including one or more processors, a main storage device, and an input and output interface for inputting and outputting signals to and from the outside. In the present embodiment, the robot control unit 290 executes a program or a command read on the main storage device by the processor to control the arm unit 210 and the suction unit 250. The robot control unit 290 operates in a robot language. As the robot language, for example, an SPEL language is used. The robot 200 may include a sandwiching unit configured to sandwich the molded object instead of the suction unit 250 configured to suck the molded object.

The control device 500 is implemented by a computer including one or more processors, a main storage device, and an input and output interface for inputting and outputting signals to and from the outside. In the present embodiment, the control device 500 is implemented by a programmable logic controller (PLC) operating in a ladder language. In the present embodiment, the control device 500 executes a program or a command read on the main storage device by the processor to supply the material from the material supply unit 105 to the injection molding machine 100, mold the molded object by the injection molding machine 100, convey the molded object to the inspection device 300 by the robot 200, inspect the molded object by the inspection device 300, convey the inspected molded object to the tray TR by the robot 200, and discharge by the tray moving unit 400 the tray TR on which the molded object is placed to the outside of the housing 50. The control device 500 controls the injection molding machine 100, the robot 200, the inspection device 300, and the tray moving unit 400 so that the start timing of each operation is a predetermined timing.

The compressor 107 coupled to the material supply unit 105, the injection molding machine 100, the inspection device 300, and the tray moving unit 400 operate in accordance with commands generated using the ladder language. The arm unit 210 and the suction unit 250 of the robot 200 operate in accordance with commands generated using the robot language. The control device 500 transmits the commands generated using the ladder language to the compressor 107, the injection molding machine 100, the inspection device 300, and the tray moving unit 400 to control operations of the compressor 107, the injection molding machine 100, the inspection device 300, and the tray moving unit 400. The control device 500 transmits a command generated using the ladder language and interpretable in the robot language to the robot control unit 290 to control operations of the arm unit 210 and the suction unit 250 by the robot control unit 290. The ladder language may be referred to as a first language, and the robot language may be referred to as a second language.

Figure 5:
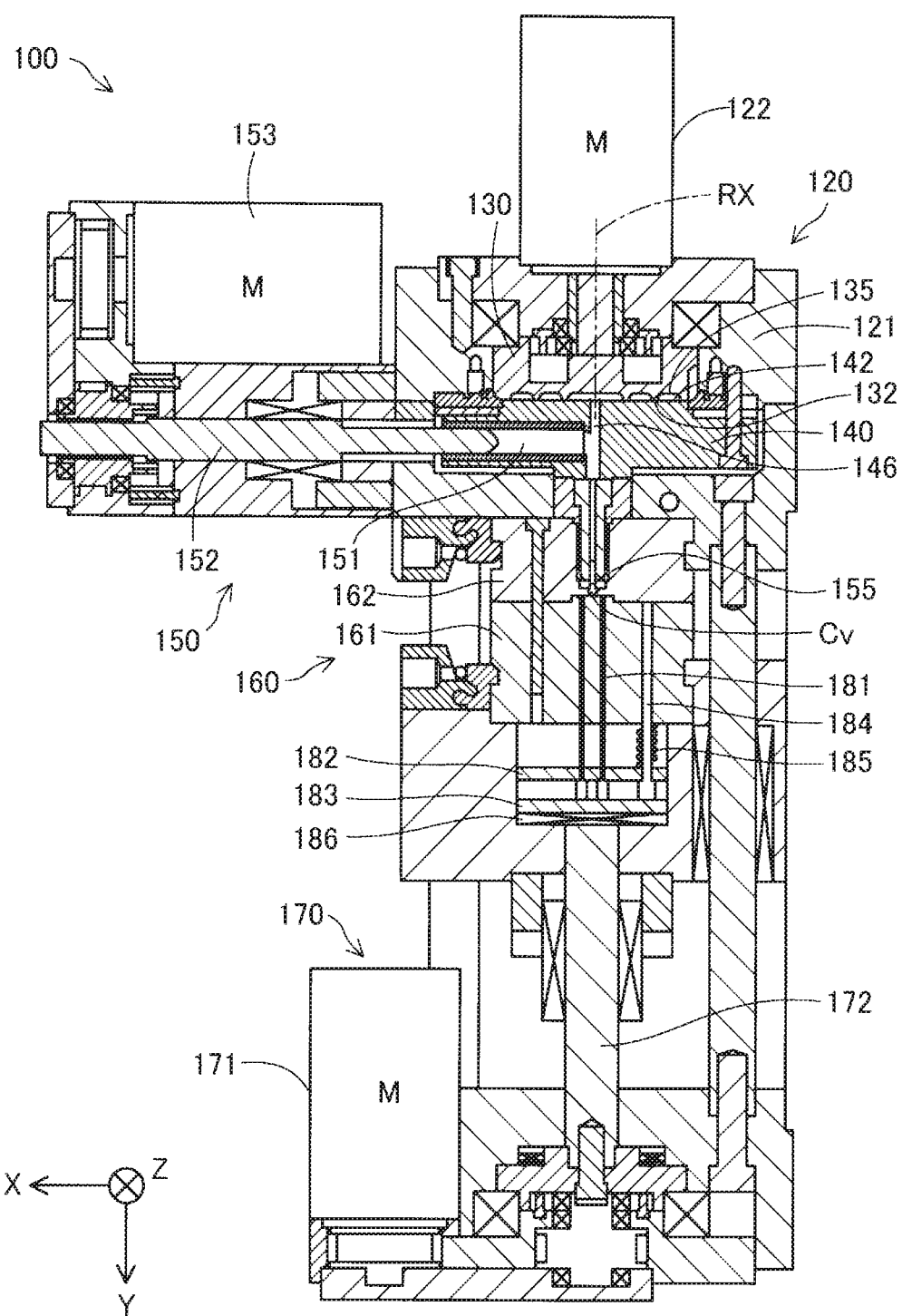
FIG. 5 is a view showing a configuration of an injection molding machine.

FIG. 5 is a diagram showing a schematic configuration of the injection molding machine 100. The injection molding machine 100 according to the present embodiment includes the above-described material storage unit 110, a plasticization unit 120, an injection control mechanism 150, a nozzle 155, the mold unit 160, and a mold clamping device 170.

The injection molding machine 100 injects a molten material from the nozzle 155 to the mold unit 160 to mold a molded object.

The material storage unit 110 stores the material supplied from the material supply unit 105 via the material supply pipe 106. The material storage unit 110 in the present embodiment is implemented by a hopper. The material storage unit 110 is in communication with the plasticization unit 120 and supplies the material to the plasticization unit 120.

The plasticization unit 120 includes a screw case 121, a drive motor 122, a flat screw 130, a barrel 140, and a heating unit 148. The plasticization unit 120 plasticizes at least a part of the material in pellet form supplied from the material storage unit 110, and generates a molten material in paste form having fluidity, and then guides the molten material to the injection control mechanism 150. The term "plasticize" refers to that the material having thermoplasticity is heated and melted. The term "melt" means not only that the material having thermoplasticity is heated to a temperature equal to or higher than a melting point to become a liquid, but also that the material having thermoplasticity is softened by being heated to a temperature equal to or higher than a glass transition point, and exhibits fluidity.

The flat screw 130 has a substantially columnar shape whose height in a direction along a central axis RX thereof is smaller than a diameter. The flat screw 130 is accommodated in a space surrounded by the screw case 121 and the barrel 140. The flat screw 130 has a groove forming surface 132 provided with a groove portion 135, which is on a surface of the flat screw 130 facing the barrel 140. The drive motor 122 is coupled to a surface of the flat screw 130 opposite to the groove forming surface 132. The flat screw 130 rotates about the central axis RX by torque generated by the drive motor 122. The drive motor 122 is driven under the control of the control device 500.

Figure 6:
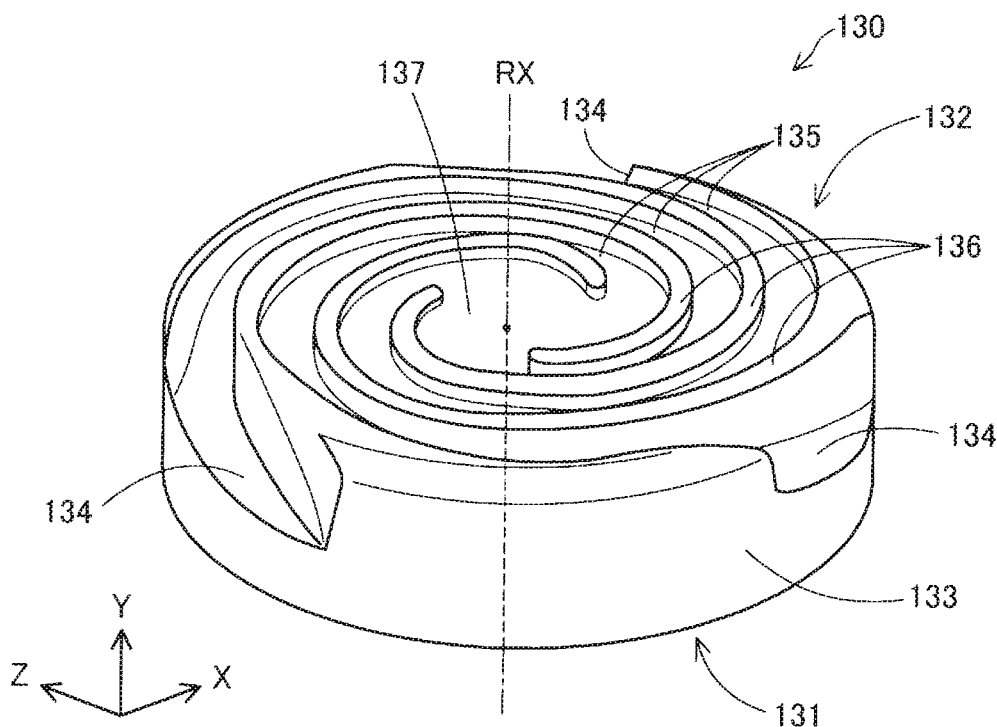
FIG. 6 is a perspective view showing a configuration of a flat screw on a groove forming surface side.

FIG. 6 is a perspective view showing a configuration of the flat screw 130 on a groove forming surface 132 side. In FIG. 6, a position of the central axis RX of the flat screw 130 is shown by a dashed line. As described with reference to FIG. 5, the groove portion 135 is provided in the groove forming surface 132. A central portion 137 of the groove forming surface 132 of the flat screw 130 is implemented as a recess to which one end of the groove portion 135 is coupled. The central portion 137 faces a communication hole 146 of the barrel 140 shown in FIG. 5. The central portion 137 intersects the central axis RX.

The groove portion 135 of the flat screw 130 constitutes a so-called scroll groove. The groove portion 135 extends from the central portion 137 toward an outer periphery of the flat screw 130 in a form of swirl so as to draw an arc. The groove portion 135 may be configured to extend spirally. The groove forming surface 132 is provided with ridge portions 136 that form side wall portions of respective groove portions 135 and extend along the respective groove portions 135. The groove portion 135 is continuous to a material introduction port 134 formed in a side surface 133 of the flat screw 130. The material introduction port 134 is a portion for receiving the material in the groove portion 135.

FIG. 6 shows an example of the flat screw 130 including three groove portions 135 and three ridge portions 136. The number of the groove portions 135 or the ridge portions 136 provided in the flat screw 130 is not limited to three. The flat screw 130 may be provided with only one groove portion 135, or may be provided with two or more groove portions 135. Any number of the ridge portions 136 may be provided in accordance with the number of the groove portions 135.

FIG. 6 illustrates an example of the flat screw 130 in which the material introduction port 134 is formed at three places. The number of the material introduction ports 134 provided in the flat screw 130 is not limited to three. In the flat screw 130, the material introduction port 134 may be provided at only one place, or may be provided at two or more places.

Figure 7:
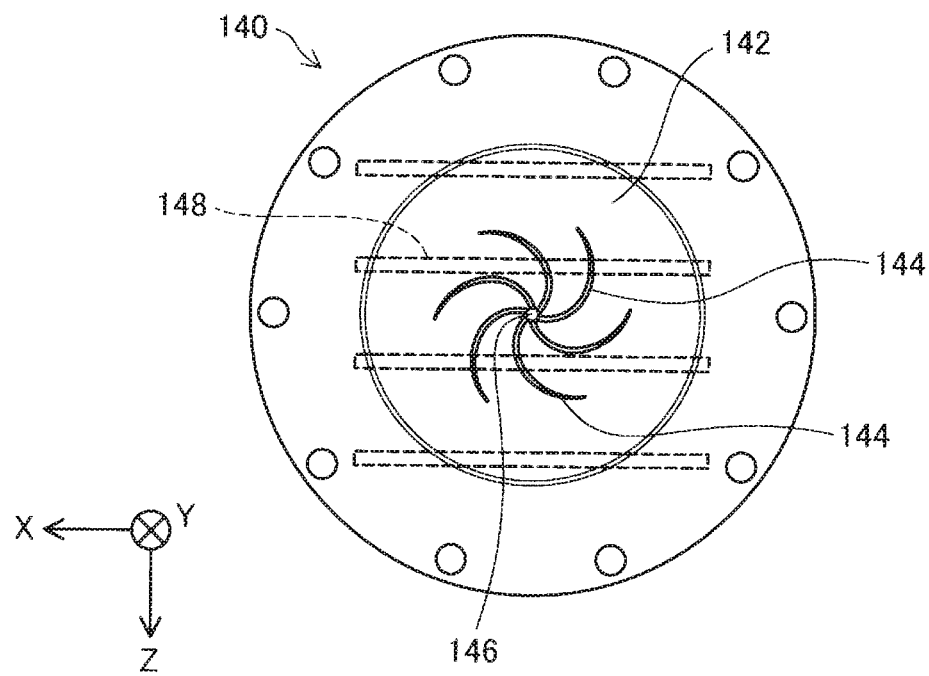
FIG. 7 is a view showing a configuration of a barrel on a screw facing surface side.

FIG. 7 is a view showing a configuration of the barrel 140 on a screw facing surface 142 side. Referring to FIGS. 5 and 7, the barrel 140 includes a screw facing surface 142 that faces the groove forming surface 132 of the flat screw 130. The communication hole 146 communicating with the nozzle 155 is provided at a center of the screw facing surface 142. A plurality of guide grooves 144 are provided around the communication hole 146 in the screw facing surface 142. One end of the guide groove 144 is coupled to the communication hole 146, and extends in a form of swirl from the communication hole 146 toward an outer periphery of the screw facing surface 142. The guide groove 144 has a function of guiding a shaping material to the communication hole 146. The screw facing surface 142 may be simply referred to as a facing surface.

The heating unit 148 is embedded in the barrel 140. In the present embodiment, the heating unit 148 includes four heaters. A temperature of the heating unit 148 is controlled by the control device 500. By rotation of the flat screw 130 and the heating by the heating unit 148, the material supplied to the groove portion 135 is melted to generate the molten material, and then the molten material is supplied to the injection control mechanism 150 through the communication hole 146.

Referring to FIG. 5, the injection control mechanism 150 includes an injection cylinder 151, a plunger 152, and a plunger drive unit 153. The injection control mechanism 150 has a function of injecting the plasticized material in the injection cylinder 151 into a cavity Cv to be described later. The injection control mechanism 150 controls an injection amount of the material from the nozzle 155 under the control of the control device 500. The injection cylinder 151 is a substantially cylindrical member coupled to the communication hole 146 of the barrel 140, and includes the plunger 152 therein. The plunger 152 slides inside the injection cylinder 151 and pumps the material in the injection cylinder 151 to a nozzle 155 side coupled to the plasticization unit 120. The plunger 152 is driven by the plunger drive unit 153 implemented by a motor, a gear, or the like.

The mold unit 160 includes a movable mold 161 and a fixed mold 162. The movable mold 161 and the fixed mold 162 are provided to face each other, and the cavity Cv that is a space corresponding to a shape of the molded object is formed between the movable mold 161 and the fixed mold 162. The plasticized material is pumped to the cavity Cv by the injection control mechanism 150 and injected via the nozzle 155. In the present embodiment, the movable mold 161 and the fixed mold 162 are formed of a metal material. The movable mold 161 and the fixed mold 162 may be formed of a ceramic material or a resin material. The mold unit 160 may be referred to as a mold portion, and the movable mold 161 may be referred to as a movable mold, and the fixed mold 162 may be referred to as a fixed mold.

The mold clamping device 170 includes a mold drive unit 171 and a ball screw unit 172, and has a function of opening and closing the movable mold 161 and the fixed mold 162. The mold drive unit 171 is implemented by a motor, a gear, or the like. The mold drive unit 171 is coupled to the movable mold 161 via the ball screw unit 172. The ball screw unit 172 transmits power of the mold drive unit 171 to the movable mold 161. Under the control of the control device 500, the mold clamping device 170 drives the mold drive unit 171 to move the movable mold 161 to open and close the mold unit 160.

In the present embodiment, a protruding mechanism 180 is provided in the mold unit 160. The protruding mechanism 180 includes an ejector pin 181, a first ejector plate 182, a second ejector plate 183, a return pin 184, and a spring member 185. The ejector pin 181 is inserted into a through hole provided in the movable mold 161. The ejector pin 181 protrudes from the movable mold 161 toward the fixed mold 162 by a movement of the movable mold 161 when the mold is opened, and pushes out the molded object from the movable mold 161. The ejector pin 181 is fixed to the first ejector plate 182 and the second ejector plate 183. A thrust bearing 186 is fixed to a surface of the second ejector plate 183 on the +Y direction side. The return pin 184 is disposed parallel to the ejector pin 181. The return pin 184 is inserted into the through hole provided in the movable mold 161. The return pin 184 is fixed to the first ejector plate 182 and the second ejector plate 183. The spring member 185 that biases the first ejector plate 182 from a −Y direction toward the +Y direction is disposed on an outer periphery of the return pin 184 between the movable mold 161 and the first ejector plate 182.

Figure 8:
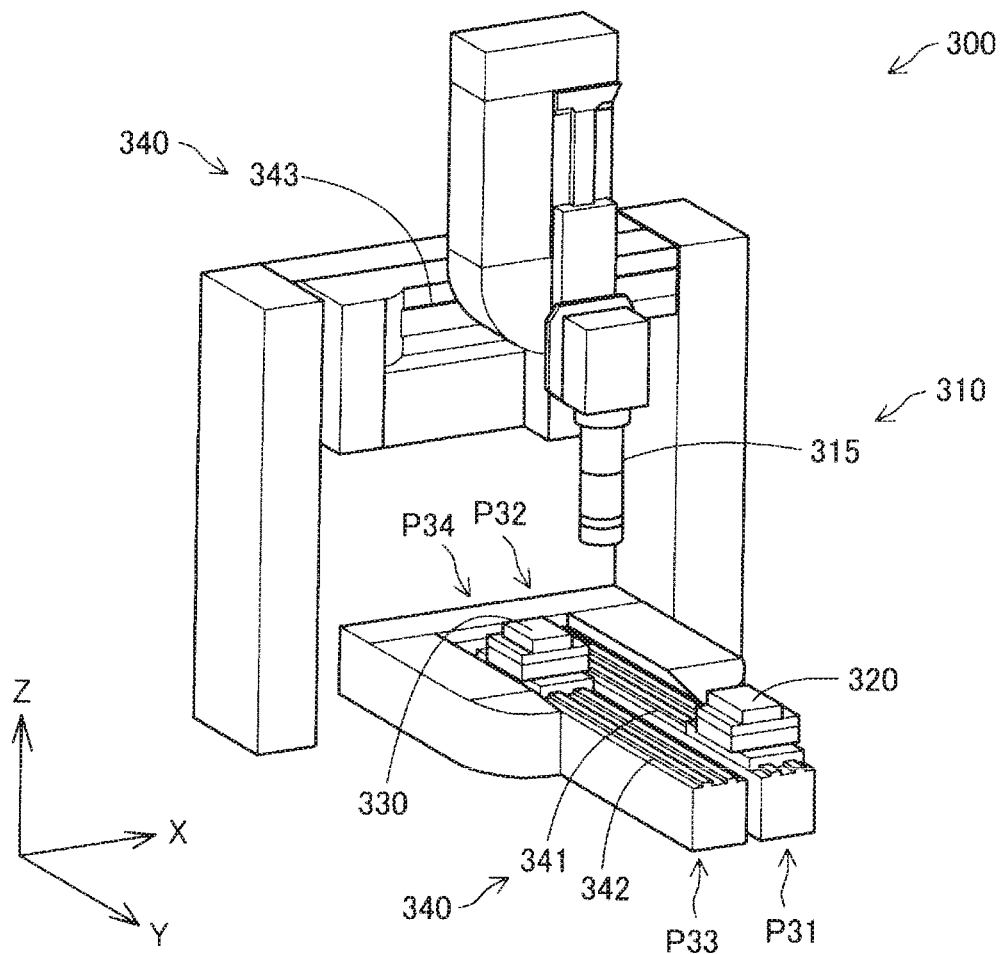
FIG. 8 is a perspective view showing a configuration of an inspection device.

FIG. 8 is a perspective view showing a schematic configuration of the inspection device 300 according to the present embodiment. The inspection device 300 inspects the molded object molded by the injection molding machine 100. In the present embodiment, the inspection device 300 includes an inspection unit 310, a first placement unit 320, a second placement unit 330, and a moving unit 340.

The inspection unit 310 includes a camera 315. The inspection unit 310 inspects whether the molded object has a predetermined external dimension by using an image captured by the camera 315. Information on an inspection result of the molded object by the inspection unit 310 is transmitted to the control device 500. The first placement unit 320 and the second placement unit 330 are disposed below the camera 315. The molded object molded by the injection molding machine 100 is placed on the first placement unit 320 and the second placement unit 330.

The moving unit 340 changes a relative position between the first placement unit 320 and the inspection unit 310 and a relative position between the second placement unit 330 and the inspection unit 310. In the present embodiment, the moving unit 340 includes a first linear actuator 341, a second linear actuator 342, and a third linear actuator 343. The first linear actuator 341 and the second linear actuator 342 are disposed along the Y direction. The third linear actuator 343 is disposed along the X direction above the first linear actuator 341 and the second linear actuator 342. The first linear actuator 341 moves the first placement unit 320 along the Y direction. The second linear actuator 342 moves the second placement unit 330 along the Y direction. The third linear actuator 343 moves the inspection unit 310 along the X direction. The linear actuators 341 to 343 are driven under the control of the control device 500.

The inspection device 300 is provided with a first delivery position P31 for delivering the molded object between the robot 200 and the first placement unit 320, a first inspection position P32 for inspecting the molded object placed on the first placement unit 320, a second delivery position P33 for delivering the molded object between the robot 200 and the second placement unit 330, and a second inspection position P34 for inspecting the molded object placed on the second placement unit 330. In the present embodiment, the first delivery position P31 is disposed at an end portion of the first linear actuator 341 on the +Y direction side, and the first inspection position P32 is disposed at an end portion of the first linear actuator 341 on a −Y direction side. The second delivery position P33 is disposed at an end portion of the second linear actuator 342 on the +Y direction side, and the second inspection position P34 is disposed at an end portion of the second linear actuator 342 on the −Y direction side. The taking-out position P11, the first delivery position P31, and the second delivery position P33 are disposed in this order from a +X direction to the −X direction.

Figure 9:
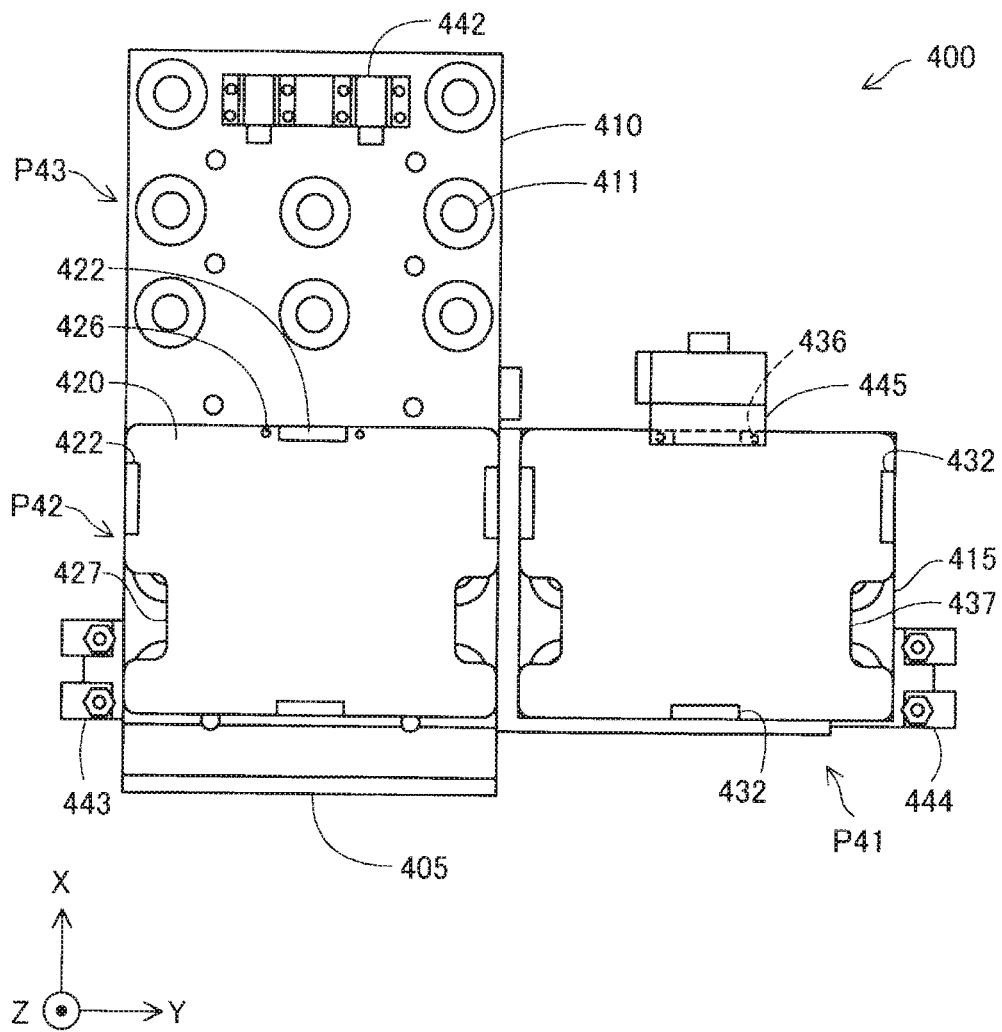
FIG. 9 is a first top view showing a configuration of a tray moving unit.
Figure 10:
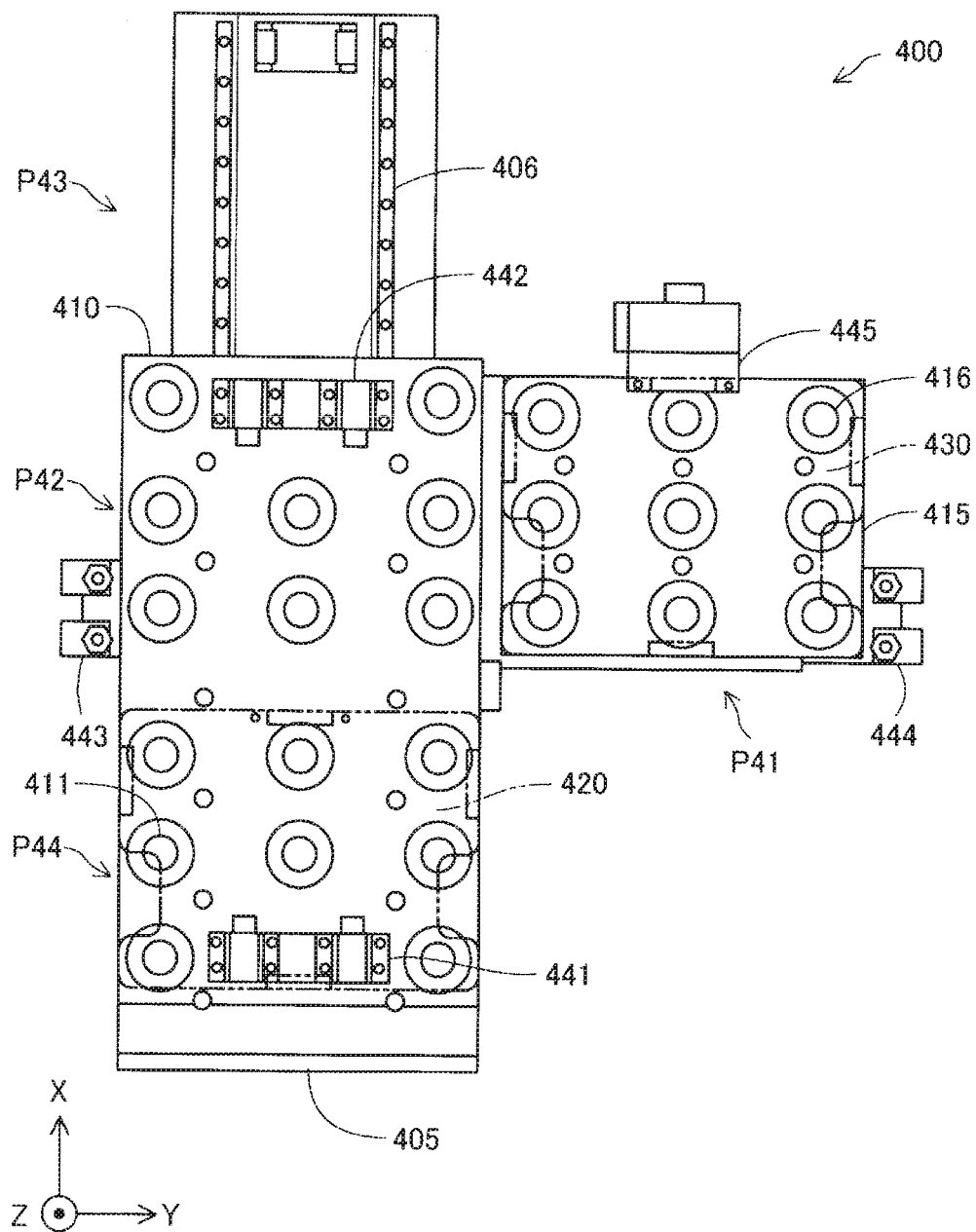
FIG. 10 is a second top view showing the configuration of the tray moving unit.

FIG. 9 is a first top view showing a schematic configuration of the tray moving unit 400. FIG. 10 is a second top view showing the schematic configuration of the tray moving unit 400. The tray moving unit 400 includes the tray discharging mechanism 405, a rail unit 406, a first fixed plate 410, a first ball 411, a second fixed plate 415, a second ball 416, a first movable plate 420, a second movable plate 430, a first drive unit 441, a second drive unit 442, a third drive unit 443, a fourth drive unit 444, and a fixing portion 445. FIG. 9 shows the tray moving unit 400 in a state in which the tray discharging mechanism 405 is accommodated in the housing 50. FIG. 10 shows the tray moving unit 400 in a state in which the tray discharging mechanism 405 protrudes from the housing 50. In FIG. 10, the first movable plate 420 and the second movable plate 430 are indicated by two-dot chain lines.

The tray discharging mechanism 405 includes a plate member and a motor, a gear, or the like for sliding the plate member. The rail unit 406 is disposed below the tray discharging mechanism 405 along the X direction. The rail unit 406 is fixed to the second base 52 of the housing 50. The tray discharging mechanism 405 slides on the rail unit 406 from the −X direction toward the +X direction to be accommodated in the housing 50 as shown in FIG. 9, and slides on the rail unit 406 from the +X direction toward the −X direction to protrude from the housing 50 as shown in FIG. 10.

The first fixed plate 410 is fixed to an upper surface of the plate member of the tray discharging mechanism 405. The first fixed plate 410 is provided with a plurality of first balls 411 rotatable with respect to the first fixed plate 410. In the present embodiment, the first balls 411 are rotatably provided in a plurality of holes provided in the first fixed plate 410. The second fixed plate 415 is fixed to the second base 52 of the housing 50. The second fixed plate 415 is disposed on the +Y direction side with respect to the tray discharging mechanism 405. The second fixed plate 415 is provided with a plurality of second balls 416 rotatable with respect to the second fixed plate 415. In the present embodiment, the second balls 416 are rotatably provided in a plurality of holes provided in the second fixed plate 415.

The first movable plate 420 and the second movable plate 430 are disposed above the first fixed plate 410 and the second fixed plate 415. Each of the movable plates 420 and 430 is a rectangular plate member. The tray TR is placed on upper surfaces of the movable plates 420 and 430. A first frame portion 422 for preventing a positional deviation of the tray TR is provided at an outer peripheral edge of the first movable plate 420. A first hole portion 426 is provided at an end portion of the first movable plate 420 on a +X direction side. At each of end portions of the first movable plate 420 on the −Y direction side and the +Y direction side, a first cutout portion 427 is provided so that the tray TR can be easily placed on the first movable plate 420 or the tray TR can be easily taken out from the first movable plate 420. A second frame portion 432 for preventing a positional deviation of the tray TR is provided at an outer peripheral edge of the second movable plate 430. A second hole portion 436 is provided at an end portion of the second movable plate 430 on the +X direction side. At each of end portions of the second movable plate 430 on the −Y direction side and the +Y direction side, a second cutout portion 437 is provided so that the tray TR can be easily placed on the second movable plate 430 or the tray TR can be easily taken out from the second movable plate 430. The movable plates 420 and 430 respectively slide on the first ball 411 and the second ball 416 independently of each other to convey the tray TR.

The first drive unit 441 is fixed to an end portion of the first fixed plate 410 on the −X direction side. The first drive unit 441 moves the movable plates 420 and 430 from the −X direction toward the +X direction. The second drive unit 442 is fixed to an end portion of the first fixed plate 410 on the +X direction side. The second drive unit 442 moves the movable plates 420 and 430 from the +X direction toward the −X direction. The third drive unit 443 is disposed on the −Y direction side with respect to the first fixed plate 410. The third drive unit 443 is fixed to the second base 52 of the housing 50. The third drive unit 443 moves the movable plates 420 and 430 from the −Y direction toward the +Y direction. The fourth drive unit 444 is disposed on the +Y direction side with respect to the second fixed plate 415. The fourth drive unit 444 is fixed to the second base 52. The fourth drive unit 444 moves the movable plates 420 and 430 from the +Y direction toward the −Y direction. In the present embodiment, each of the drive units 441 to 444 is implemented by an air cylinder that pushes out the movable plates 420 and 430. Each of the drive units 441 to 444 may not be implemented by an air cylinder, but by a motor, a solenoid, or the like.

The fixing portion 445 fixes the movable plates 420 and 430 on the second fixed plate 415. In the present embodiment, the fixing portion 445 includes pins protruding downward, and the movable plates 420 and 430 are fixed by fitting the pins into the hole portions 426 and 436 of the movable plates 420 and 430. The fixing portion 445 may include a pad instead of the pins, and the movable plates 420 and 430 may be fixed by pressing the movable plates 420 and 430 with the pad.

A work area for moving the tray TR is provided on the tray moving unit 400. In the present embodiment, the work area is provided with a placement position P41, a first standby position P42, a second standby position P43, and a discharge position P44. The placement position P41 is provided on the second fixed plate 415. The first standby position P42 and the second standby position P43 are provided on the tray discharging mechanism 405 accommodated in the housing 50 and on the first fixed plate 410. The discharge position P44 is provided on a portion of the tray discharging mechanism 405 protruding from the housing 50 that protrudes from the housing 50 and on the first fixed plate 410. The discharge position P44, the first standby position P42, and the second standby position P43 are provided in this order from the −X direction to the +X direction. The first standby position P42 is provided on the −Y direction side with respect to the placement position P41. The placement position P41 is a position where the molded object is placed on the tray TR by the robot 200. The first standby position P42 and the second standby position P43 are positions for standing by for the tray TR. The discharge position P44 is a position where the tray TR is placed on the movable plates 420 and 430, and a position where the tray TR is taken out from the movable plates 420 and 430. A center of the placement position P41 is positioned in the X direction between the first delivery position P31 and the second delivery position P33 shown in FIG. 4. Details of the operation of the tray moving unit 400 will be described later.

Figure 11:
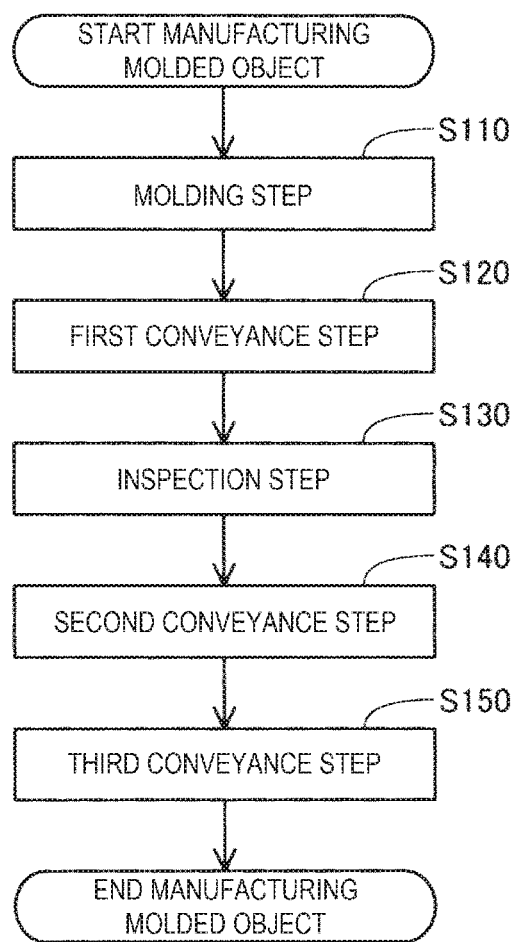
FIG. 11 is a diagram showing a process of manufacturing a molded object by the injection molding system.

FIG. 11 is a diagram showing a process of manufacturing the molded object by the injection molding system 10 according to the present embodiment. First, in a molding step of step S110, a molded object is molded by the injection molding machine 100. Next, in a first conveyance step of step S120, the robot 200 takes out the molded object from the mold unit 160 of the injection molding machine 100, and conveys the molded object from the mold unit 160 to the first placement unit 320 or the second placement unit 330 of the inspection device 300. In the first conveyance step, at the taking-out position P11, the molded object is taken out from the mold unit 160 by the robot 200. The molded object taken out from the mold unit 160 is conveyed by the robot 200 to be placed on the first placement unit 320 disposed at the first delivery position P31 or the second placement unit 330 disposed at the second delivery position P33.

Thereafter, in an inspection step of step S130, the molded object is inspected by the inspection device 300. When the molded object is placed on the first placement unit 320 in the first conveyance step, in the inspection step, the first placement unit 320 is moved from the first delivery position P31 to the first inspection position P32, the molded object is inspected by the inspection unit 310, and then the first placement unit 320 is moved from the first inspection position P32 to the first delivery position P31. When the molded object is placed on the second placement unit 330 in the first conveyance step, in the inspection step, the second placement unit 330 is moved from the second delivery position P33 to the second inspection position P34, the molded object is inspected by the inspection unit 310, and then the second placement unit 330 is moved from the second inspection position P34 to the second delivery position P33.

In a second conveyance step of step S140, the molded object after inspection is conveyed from the inspection device 300 to the tray TR by the robot 200. When the molded object placed on the first placement unit 320 is inspected in the inspection step, in the second conveyance step, the robot 200 takes out the molded object after the inspection from the first placement unit 320 that has moved to the first delivery position P31. The molded object taken out from the first placement unit 320 is conveyed by the robot 200 to be placed on the tray TR disposed at the placement position P41. When the molded object placed on the second placement unit 330 is inspected in the inspection step, in the second conveyance step, the robot 200 takes out the molded object after the inspection from the second placement unit 330 that has moved to the second delivery position P33. The molded object taken out from the second placement unit 330 is conveyed by the robot 200 to be placed on the tray TR disposed at the placement position P41. In a third conveyance step of step S150, the tray TR on which the molded object after the inspection is placed is conveyed by the tray moving unit 400 from the placement position P41 to the discharge position P44 to be discharged to the outside of the housing 50.

Figure 12:
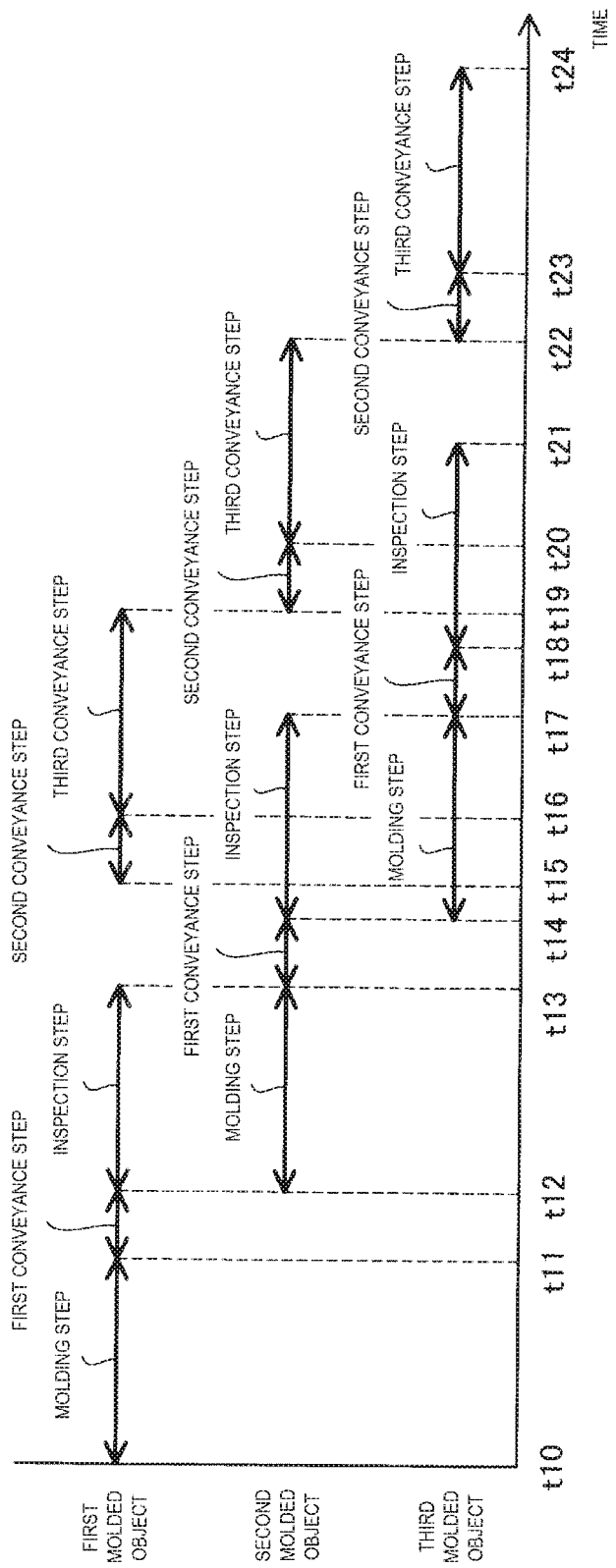
FIG. 12 is a time chart showing the process of manufacturing the molded object by the injection molding system.

FIG. 12 is a time chart showing the process of manufacturing the molded object by the injection molding system 10 according to the present embodiment. In the present embodiment, the injection molding machine 100 repeatedly molds the molded object by repeating the molding step. In the present embodiment, the control device 500 controls the injection molding machine 100, the robot 200, and the inspection device 300 to overlap a period during which the inspection step is performed for a previously molded object and a period during which the molding step is performed for a subsequently molded object, and overlap a period during which the second conveyance step is performed for the previously molded object and a period during which the inspection step is performed for the subsequently molded object. The overlapping of the periods means that the two periods coincide with each other, one of the two periods is included in the other period, and a portion of one of the two periods overlaps with a portion of the other period. In the following description, the molded object molded in the first molding step is referred to as a first molded object, the molded object molded in the second molding step is referred to as a second molded object, and the molded object molded in the third molding step is referred to as a third molded object.

During a period from a timing t10 to a timing t11, the molding step is performed for the first molded object. During a period from the timing t11 to a timing t12, the first conveyance step is performed for the first molded object. During a period from the timing t12 to a timing t13, the inspection step is performed for the first molded object. During a period from a timing t15 to a timing t16, the second conveyance step is performed for the first molded object. During a period from the timing t16 to a timing t19, the third conveyance step is performed for the first molded object.

During the period from the timing t12 to the timing t13, the molding step is performed for the second molded object. Therefore, the period during which the inspection step is performed for the first molded object coincides with the period during which the molding step is performed for the second molded object. During a period from the timing t13 to a timing t14, the first conveyance step is performed for the second molded object. During a period from the timing t14 to a timing t17, the inspection step is performed for the second molded object. Therefore, the period during which the inspection step is performed for the second molded object coincides with the period during which the second conveyance step is performed for the first molded object. During a period from the timing t19 to a timing t20, the second conveyance step is performed for the second molded object. During a period from the timing t20 to a timing t22, the third conveyance step is performed for the second molded object.

During the period from the timing t14 to the timing t17, the molding step is performed for the third molded object. Therefore, the period during which the inspection step is performed for the second molded object coincides with the period during which the molding step is performed for the third molded object, and includes the period during which the second conveyance step is performed for the first molded object. During a period from the timing t17 to a timing t18, the first conveyance step is performed for the third molded object. During a period from the timing t18 to the timing t21, the inspection step is performed for the third molded object. Therefore, the period during which the inspection step is performed for the third molded object includes the period during which the second conveyance step is performed for the second molded object. During a period from the timing t22 to a timing t23, the second conveyance step is performed for the third molded object. During a period from the timing t23 to the timing t24, the third conveyance step is performed for the third molded object.

Figure 13:
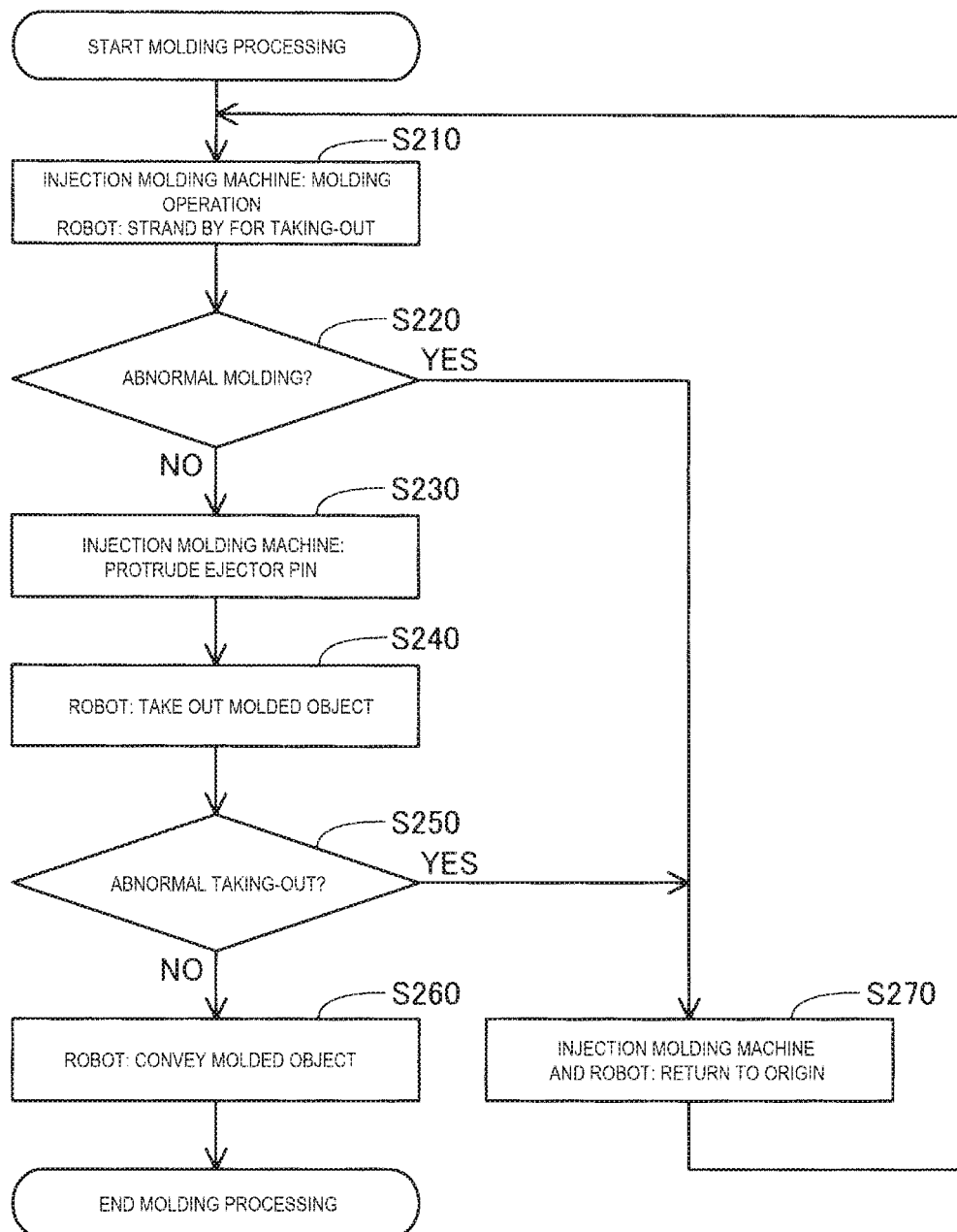
FIG. 13 is a flowchart showing contents of a molding processing.

FIG. 13 is a flowchart showing contents of a molding processing for molding the molded object. FIG. 13 shows the contents of a processing for implementing the molding step for molding the first molded object and the first conveyance step for conveying the first molded object. This processing is executed by the control device 500 when the predetermined start operation is performed, by the user, on the operation panel 55 provided in the housing 50. First, in step S210, the control device 500 controls the injection molding machine 100 to execute a molding operation in which the mold unit 160 is closed to inject the molten material to the mold unit 160, and then controls the robot 200 to execute a taking-out preparation operation for preparing the taking-out of the molded object from the mold unit 160 by the robot 200. In the taking-out preparation operation, the control device 500 causes the suction unit 250 of the robot 200 to stand by in a vicinity of the mold unit 160.

Next, in step S220, the control device 500 determines whether an error occurs in the injection molding machine 100 in the molding operation of the injection molding machine 100. In the present embodiment, the control device 500 determines that an error occurs in the injection molding machine 100 in at least one of a case where an injection failure in which the molten material is not normally injected from the nozzle 155 is detected and a case where a mold clamping failure in which the mold unit 160 is not normally clamped is detected. When at least one of a magnitude of a load of the drive motor 122 of the plasticization unit 120 and a magnitude of a load of the motor of the plunger drive unit 153 is equal to or larger than a predetermined magnitude, an injection failure is detected by the control device 500. When a magnitude of a load of the motor of the mold drive unit 171 is equal to or larger than a predetermined magnitude, a mold clamping failure is detected by the control device 500. The magnitude of the load of the drive motor 122 of the plasticization unit 120 can be measured using a magnitude of a current supplied to the drive motor 122 of the plasticization unit 120. The magnitude of the load of the plunger drive unit 153 can be measured using a magnitude of a current supplied to the motor of the plunger drive unit 153. The magnitude of the load of the motor of the mold drive unit 171 can be measured using a magnitude of a current supplied to the motor of the mold drive unit 171.

When it is determined in step S220 that an error occurs in the injection molding machine 100, in step S270, the control device 500 controls the injection molding machine 100 and the robot 200 to cause the injection molding machine 100 and the robot 200 to execute return operations. In the present embodiment, after the return operation of the injection molding machine 100 is ended, the control device 500 causes the robot 200 to start the return operation. In the return operation of the injection molding machine 100, the control device 500 moves the movable mold 161 to an origin position thereof. The origin position of the movable mold 161 is a position of the movable mold 161 in which the mold unit 160 is opened. In the return operation of the robot 200, the control device 500 moves the suction unit 250 and the arm unit 210 of the robot 200 to respective preset origin positions.

When it is determined in step S220 that an error does not occur in the injection molding machine 100, in step S230, the control device 500 controls the injection molding machine 100 to push out the molded object from the movable mold 161 by the ejector pin 181, and in step S240, the control device 500 causes the robot 200 to execute a taking-out operation of sucking the molded object by the suction unit 250 and then taking out the molded object pushed out by the ejector pin 181.

In step S250, the control device 500 determines whether an error occurs in the robot 200 in the taking-out operation of the robot 200. In the present embodiment, the control device 500 determines that an error occurs in the robot 200 when a suction failure in which the molded object is not normally sucked by the suction unit 250 of the robot 200 is detected. A pressure gauge is provided inside the suction unit 250, and the control device 500 can detect a suction failure by using a pressure value of the air measured by the pressure gauge.

When it is determined in step S250 that an error occurs in the robot 200, in step S270, the control device 500 controls the injection molding machine 100 and the robot 200 to cause the injection molding machine 100 and the robot 200 to execute the return operations as described above. On the other hand, when it is determined in step S250 that an error does not occur in the robot 200, in step S260, the control device 500 controls the robot 200 to convey the molded object sucked by the suction unit 250 to the inspection device 300 to end the processing.

Figure 14:
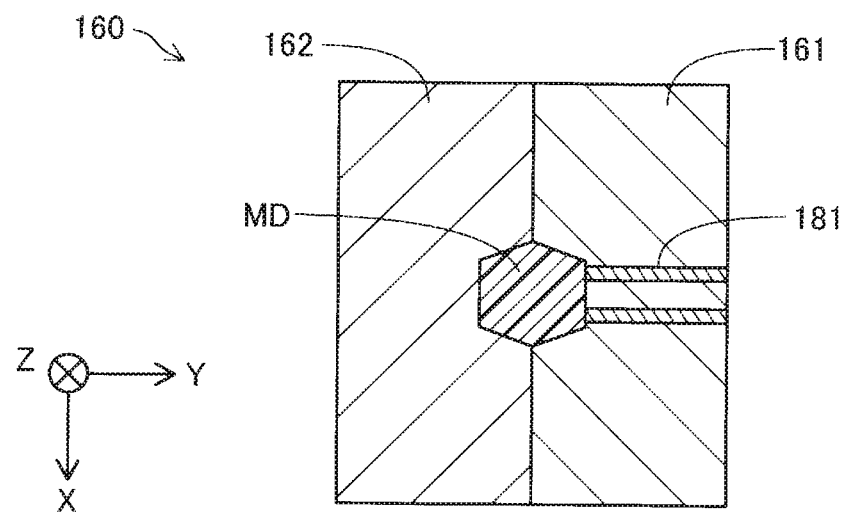
FIG. 14 is a first diagram showing a state in which the molded object is protruded by an ejector pin.
Figure 15:
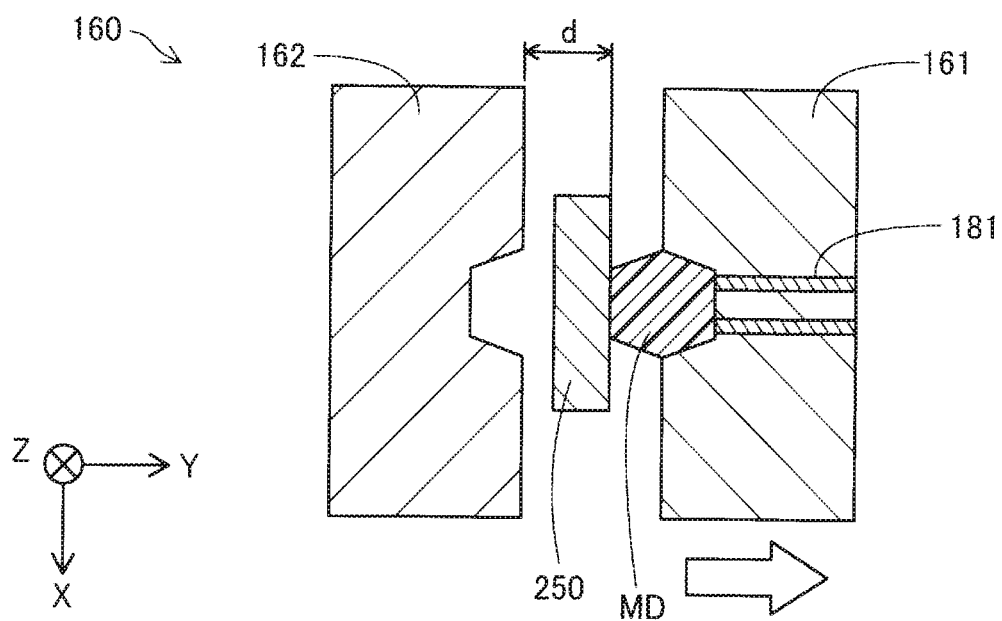
FIG. 15 is a second diagram showing a state in which the molded object is protruded by the ejector pin.
Figure 16:
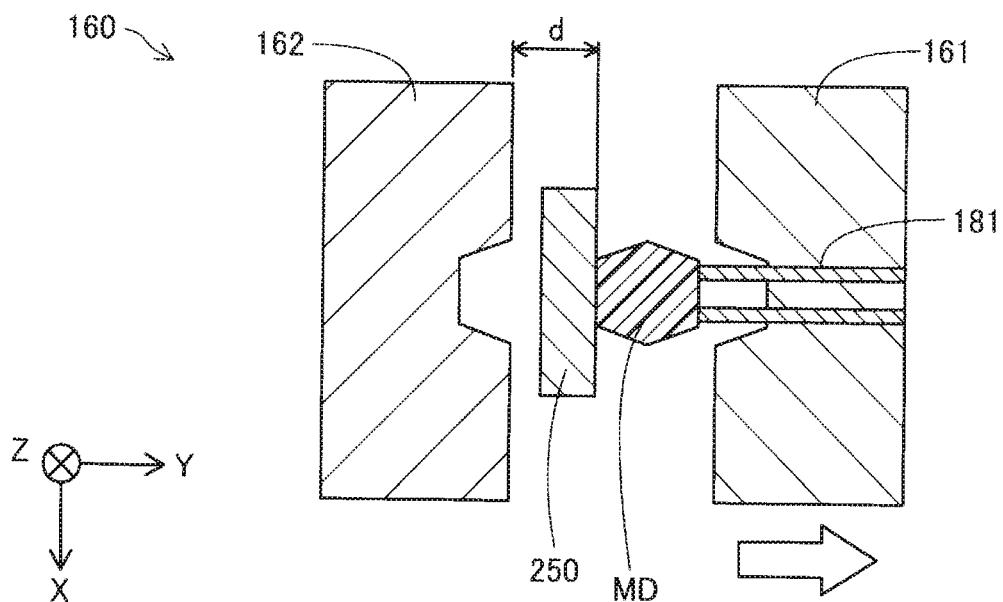
FIG. 16 is a third diagram showing a state in which the molded object is protruded by the ejector pin.

FIGS. 14 and 16 are diagrams showing states in which a molded object MD is protruded from the movable mold 161 by the ejector pin 181. In FIG. 14, a space between the movable mold 161 and the fixed mold 162 is closed. As shown in FIG. 15, the control device 500 moves the movable mold 161 in a direction away from the fixed mold 162. At this time, the ejector pin 181 moves together with the movable mold 161 until the thrust bearing 186 shown in FIG. 5 comes into contact with a tip end portion of the ball screw unit 172. A movement of the ejector pin 181 in the direction away from the fixed mold 162 is restricted by bringing the thrust bearing 186 into contact with the tip end portion of the ball screw unit 172. When the thrust bearing 186 comes into contact with the tip end portion of the ball screw unit 172, the control device 500 temporarily stops the movement of the movable mold 161, and moves the suction unit 250 between the movable mold 161 and the fixed mold 162. The control device 500 causes the suction unit 250 to suck the molded object MD in a state where a distance between the molded object MD and the fixed mold 162 is kept at a predetermined distance d. After the molded object MD is sucked by the suction unit 250, the control device 500 restarts the movement of the movable mold 161 as shown in FIG. 16. Since the movement of the ejector pin 181 in the direction away from the fixed mold 162 is restricted, the ejector pin 181 is protruded from the movable mold 161 toward the fixed mold 162 by the movement of the movable mold 161 to push out the molded object MD from the movable mold 161. When the molded object MD is pushed out from the movable mold 161, the distance between the molded object MD and the fixed mold 162 is kept at the predetermined distance d. Thereafter, when the movable mold 161 moves in a direction approaching the fixed mold 162, the first ejector plate 182 is biased by the spring member 185 to accommodate the ejector pin 181 in the through hole of the movable mold 161.

Figure 17:
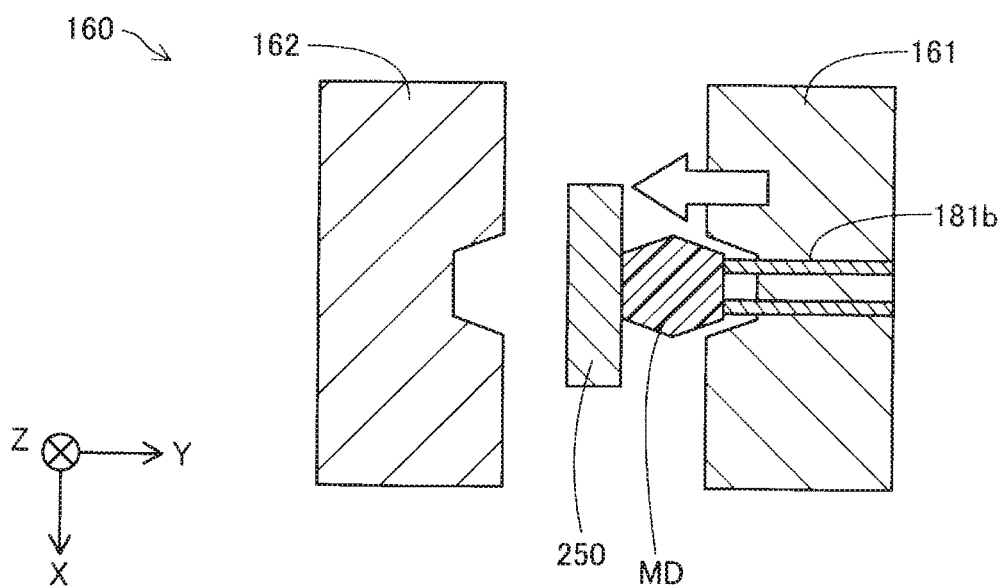
FIG. 17 is a reference diagram showing a state in which the molded object is protruded by the ejector pin.

FIG. 17 is a reference diagram showing a state in which the molded object MD is protruded by an ejector pin 181b according to another form. In another form shown in FIG. 17, the ejector pin 181b moves with respect to the movable mold 161 and the fixed mold 162, and the ejector pin 181b protrudes from the movable mold 161 toward the fixed mold 162, thereby pushing out the molded object MD from the movable mold 161. In this form, the distance between the molded object MD and the fixed mold 162 changes before and after the molded object MD is pushed out from the movable mold 161. Therefore, an operation of the robot 200 when the molded object MD is sucked by the suction unit 250 is complicated. In addition, since a motor or the like for moving the ejector pin 181b is required, the configuration of the injection molding machine 100 is complicated.

The inspection step will be described with reference to FIG. 8. After the molded object is placed on the first placement unit 320, the control device 500 controls the moving unit 340 to move the first placement unit 320 from the first delivery position P31 to the first inspection position P32, and then move the inspection unit 310 from the second inspection position P34 to the first inspection position P32. After the molded object placed on the first placement unit 320 is inspected by the inspection unit 310 at the first inspection position P32, the control device 500 controls the moving unit 340 to move the first placement unit 320 from the first inspection position P32 to the first delivery position P31. After the molded object is placed on the second placement unit 330, the control device 500 controls the moving unit 340 to move the second placement unit 330 from the second delivery position P33 to the second inspection position P34, and then move the inspection unit 310 from the first inspection position P32 to the second inspection position P34. After the molded object placed on the second placement unit 330 is inspected by the inspection unit 310 at the second inspection position, the control device 500 controls the moving unit 340 to move the second placement unit 330 from the second inspection position P34 to the second delivery position P33. When the inspected molded object has the predetermined external dimension, the control device 500 controls the robot 200 to convey the molded object after the inspection from the inspection device 300 to the tray TR. On the other hand, when the molded object does not have the predetermined external dimension, the control device 500 controls the robot 200 to convey the molded object after the inspection from the inspection device 300 to a disposal box (not shown).

Figure 18:
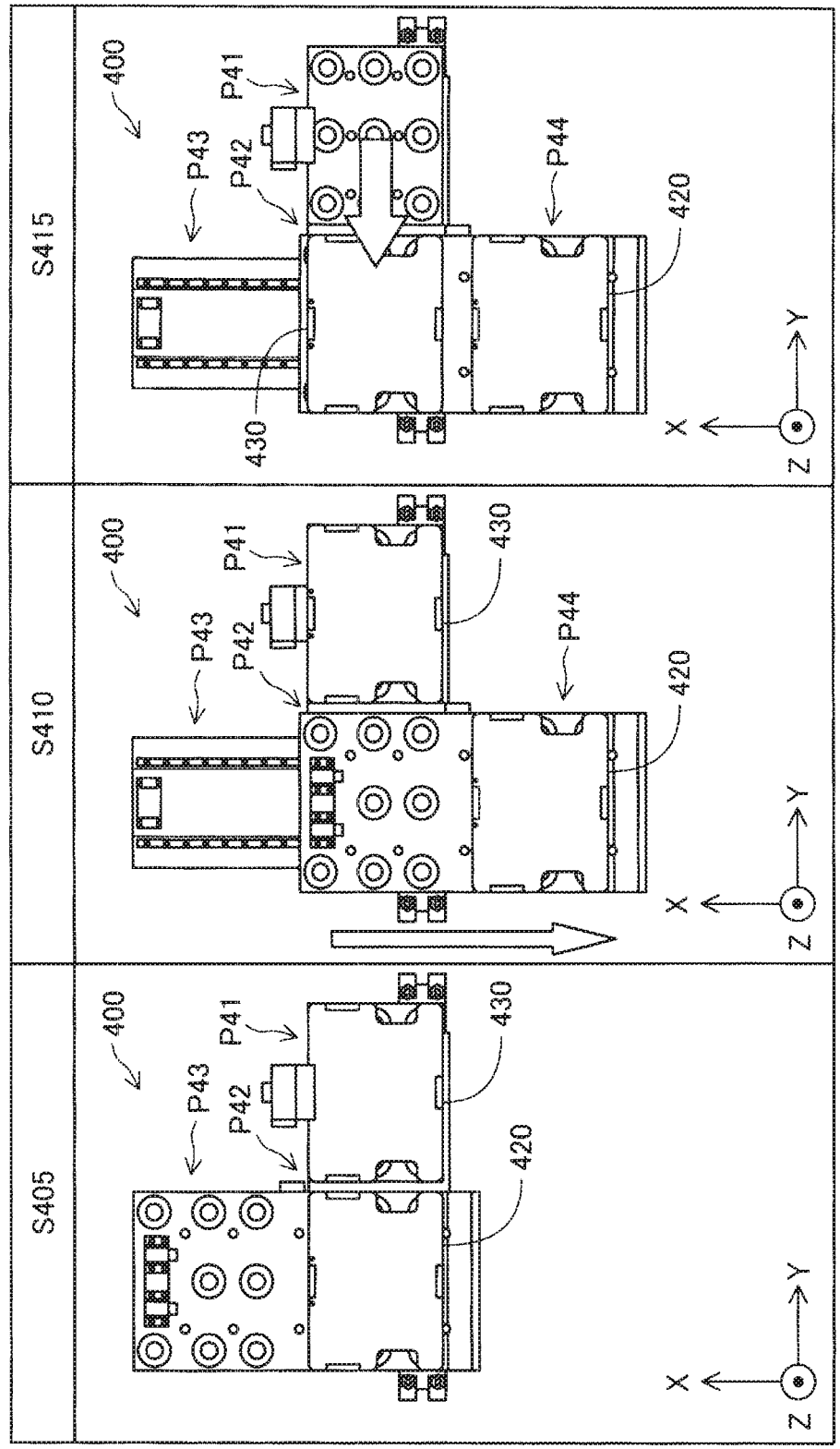
FIG. 18 is a first diagram showing an operation of the tray moving unit.

FIGS. 18 to 22 are diagrams showing operations of the tray moving unit 400. Referring to FIG. 18, in an initial state of step S405, the first movable plate 420 is disposed at the first standby position P42, and the second movable plate 430 is disposed at the placement position P41. In step S410, the control device 500 drives the tray discharging mechanism 405 to cause the tray discharging mechanism 405 to protrude to the outside of the housing 50. When the tray discharging mechanism 405 protrudes to the outside of the housing 50, the first movable plate 420 moves from the first standby position P42 to the discharge position P44. For example, when the operation panel 55 provided in the housing 50 is operated by the user, the control device 500 drives the tray discharging mechanism 405. In step S415, the control device 500 drives the fourth drive unit 444 to move the second movable plate 430 from the placement position P41 to the first standby position P42.

Figure 19:
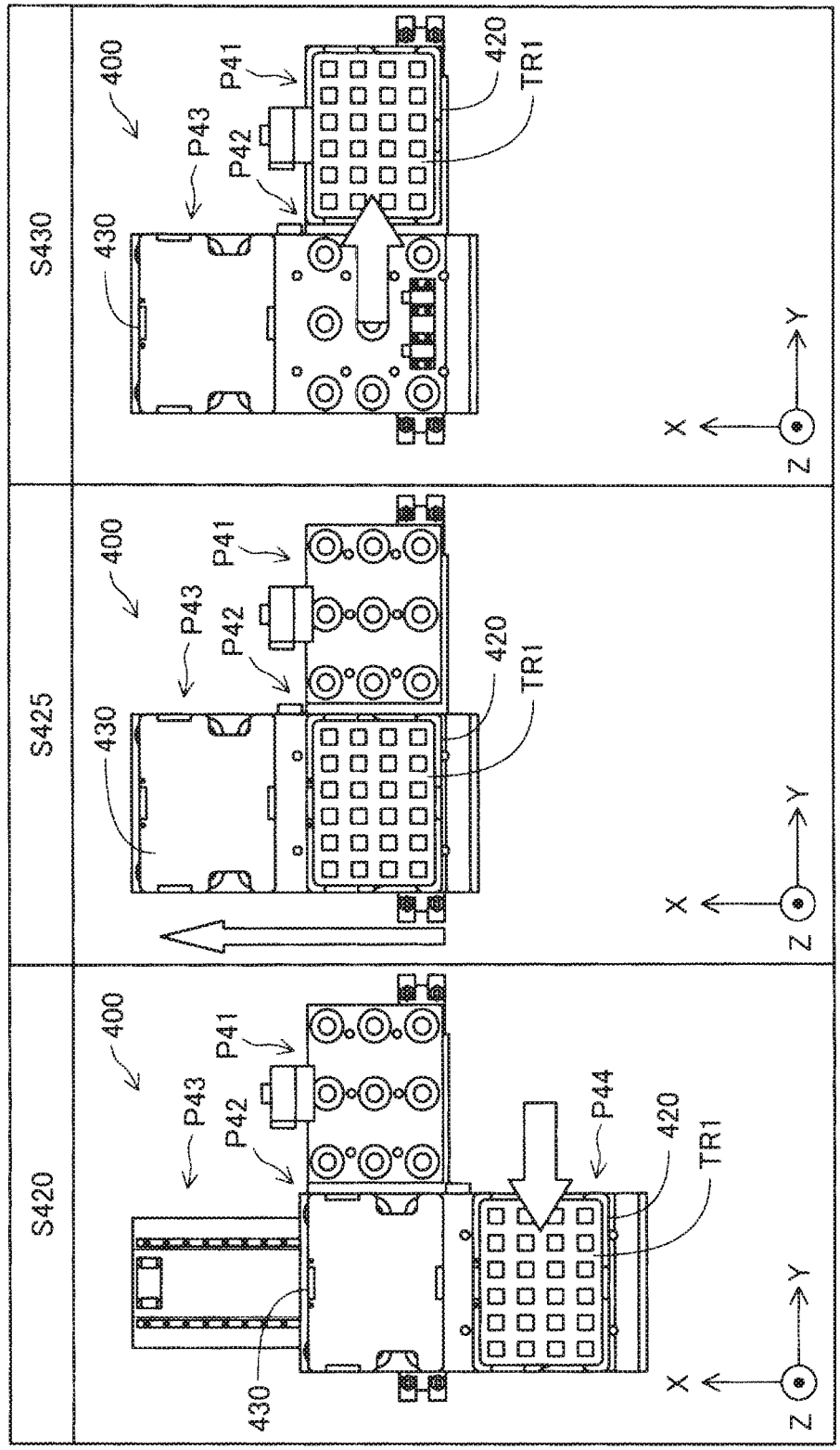
FIG. 19 is a second diagram showing an operation of the tray moving unit.

Referring to FIG. 19, in step S420, an empty first tray TR1 is placed on the first movable plate 420 disposed at the discharge position P44. In the present embodiment, the first tray TR1 is placed on the first movable plate 420 by the user. In step S425, the control device 500 drives the tray discharging mechanism 405 to accommodate, in the housing 50, the tray discharging mechanism 405 protruding to the outside of the housing 50. When the tray discharging mechanism 405 is accommodated in the housing 50, the first movable plate 420 on which the first tray TR1 is placed moves from the discharge position P44 to the first standby position P42, and the second movable plate 430 moves from the first standby position P42 to the second standby position P43. In step S430, the control device 500 drives the third drive unit 443 to move the first movable plate 420 on which the first tray TR1 is placed from the first standby position P42 to the placement position P41, and drives the fixing portion 445 to fix the first movable plate 420 on which the first tray TR1 is placed to the placement position P41. After the first movable plate 420 on which the first tray TR1 is placed is fixed to the placement position P41, placement of the molded object MD on the first tray TR1 is started by the robot 200.

Figure 20:
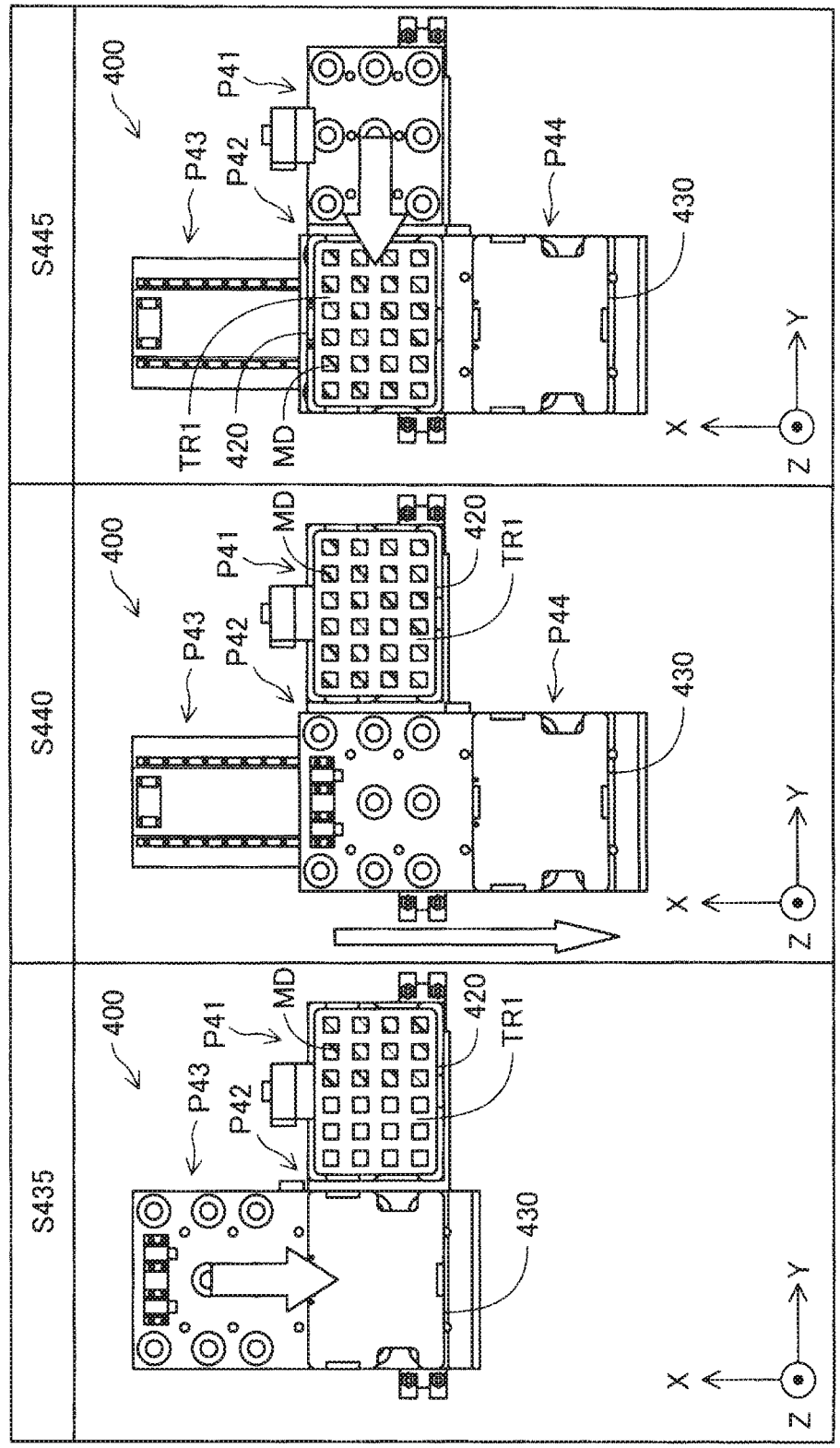
FIG. 20 is a third diagram showing an operation of the tray moving unit.

Referring to FIG. 20, in step S435, the control device 500 drives the second drive unit 442 to move the second movable plate 430 from the second standby position P43 to the first standby position P42. In step S440, the control device 500 drives the tray discharging mechanism 405 to cause the tray discharging mechanism 405 to protrude to the outside of the housing 50. When the tray discharging mechanism 405 protrudes to the outside of the housing 50, the second movable plate 430 moves from the first standby position P42 to the discharge position P44. In step S445, the control device 500 drives the fixing portion 445 to release the fixing of the first movable plate 420 on which the first tray TR1 is placed, and then drives the fourth drive unit 444 to move the first movable plate 420 on which the first tray TR1 is placed from the placement position P41 to the first standby position P42.

Figure 21:
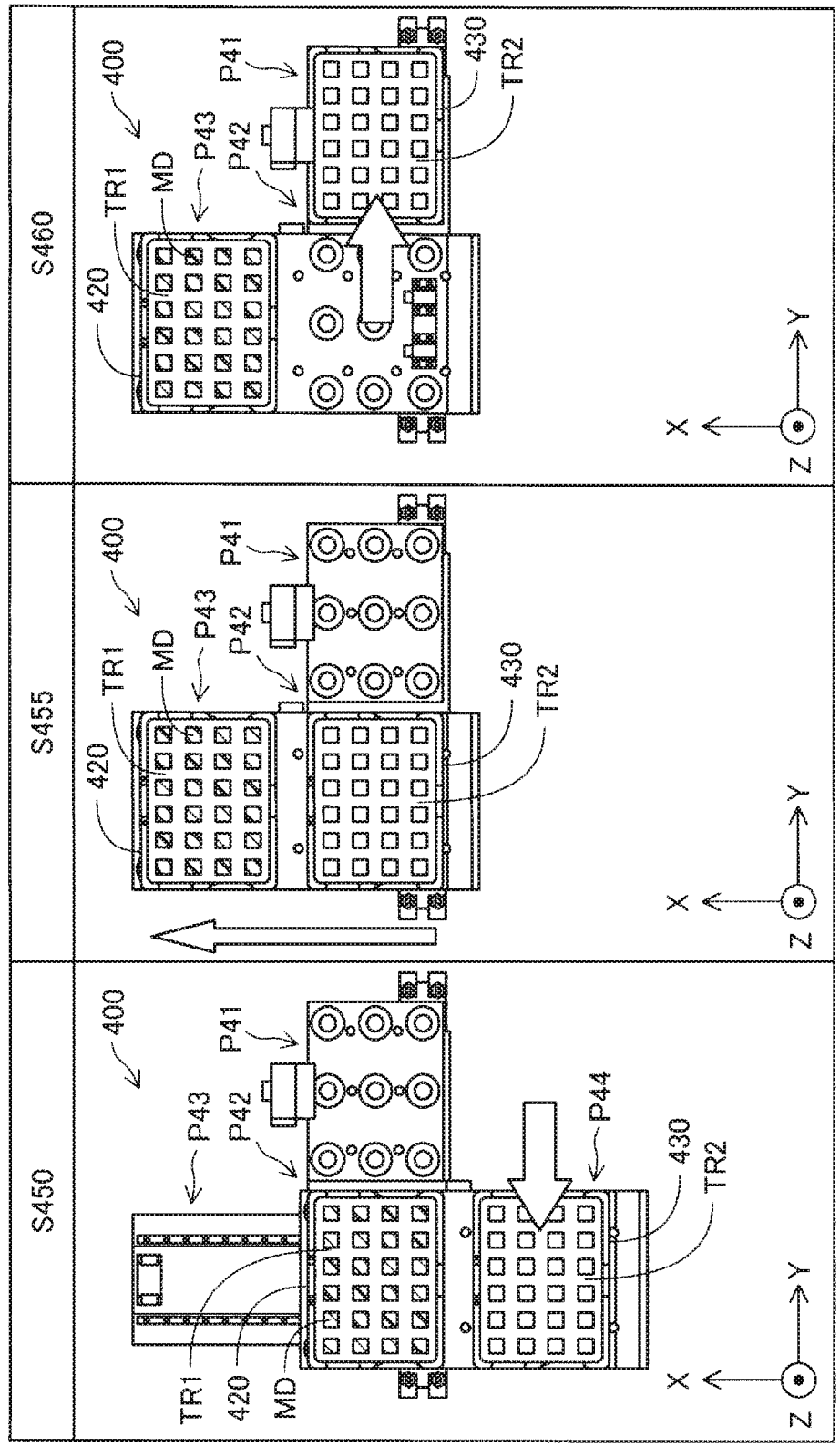
FIG. 21 is a fourth diagram showing an operation of the tray moving unit.

Referring to FIG. 21, in step S450, a second tray TR2 is placed on the second movable plate 430 disposed at the discharge position P44. In the present embodiment, the second tray TR2 is placed on the second movable plate 430 by the user. In step S455, the control device 500 drives the tray discharging mechanism 405 to accommodate the tray discharging mechanism 405 in the housing 50. When the tray discharging mechanism 405 is accommodated in the housing 50, the first movable plate 420 on which the first tray TR1 is placed moves from the first standby position P42 to the second standby position P43, and the second movable plate 430 on which the second tray TR2 is placed moves from the discharge position P44 to the first standby position P42. In step S460, the control device 500 drives the third drive unit 443 to move the second movable plate 430 on which the second tray TR2 is placed from the first standby position P42 to the placement position P41, and drives the fixing portion 445 to fix the second movable plate 430 to the placement position P41. After the second movable plate 430 on which the second tray TR2 is placed is fixed to the placement position P41, the placement of the molded object MD on the second tray TR2 is started by the robot 200.

Figure 22:
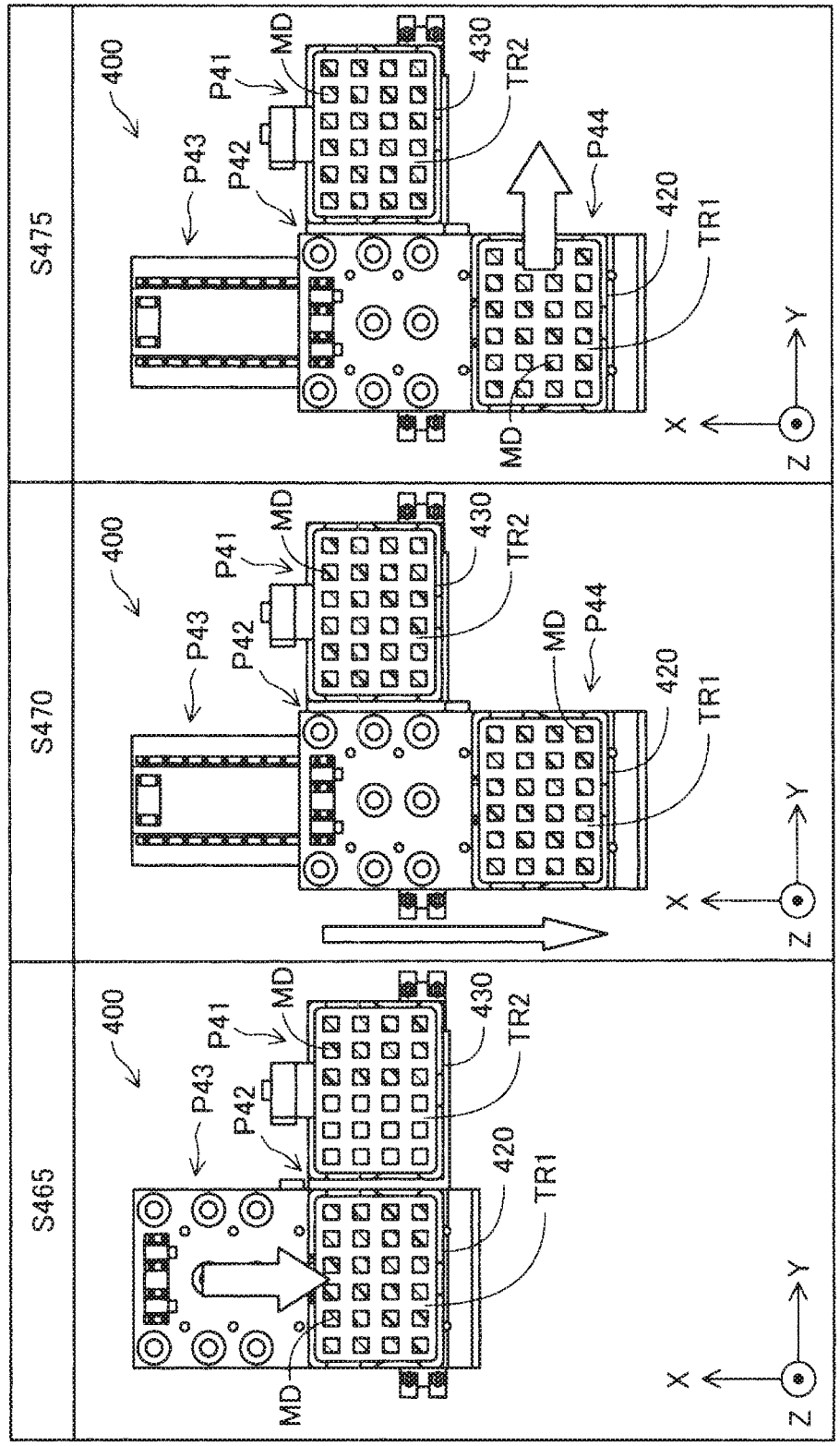
FIG. 22 is a fifth diagram showing an operation of the tray moving unit.

Referring to FIG. 22, in step S465, the control device 500 drives the second drive unit 442 to move the first movable plate 420 on which the first tray TR1 is placed from the second standby position P43 to the first standby position P42. In step S470, the control device 500 drives the tray discharging mechanism 405 to cause the tray discharging mechanism 405 to protrude to the outside of the housing 50. When the tray discharging mechanism 405 protrudes to the outside of the housing 50, the first movable plate 420 on which the first tray TR1 is placed moves from the first standby position P42 to the discharge position P44. In step S475, the first tray TR1 on which the molded object MD is placed is taken out from the first movable plate 420 disposed at the discharge position P44. In the present embodiment, the first tray TR1 is taken out from the first movable plate 420 by the user.

Thereafter, the processings from step S415 to step S475 are repeated. An empty third tray is placed on the first movable plate 420 disposed at the discharge position P44 to move to the placement position P41, and the second movable plate 430 on which the second tray TR2 is placed moves to the discharge position P44. The third tray may not be used. For example, after the first tray TR1 is taken out from the first movable plate 420 and the molded object is taken out from the first tray TR1, the first tray TR1 may be placed on the first movable plate 420 again. The molded object MD may be taken out from the first tray TR1 while the first tray TR1 is placed on the first movable plate 420.

Figure 23:
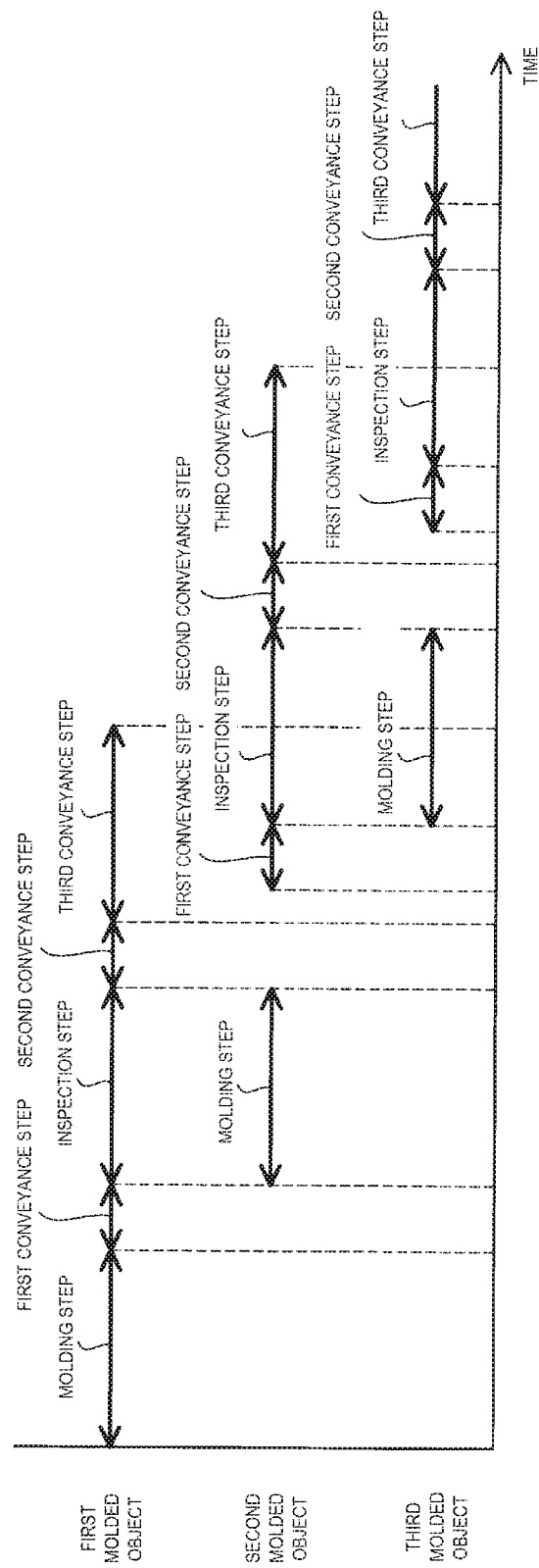
FIG. 23 is a time chart showing a process of manufacturing the molded object according to a comparative example.

FIG. 23 is a time chart showing a process of manufacturing the molded object according to a comparative example. In the comparative example, the second delivery position P33 and the second inspection position P34 are not provided. Therefore, the first conveyance step cannot be performed for the second molded object until the second conveyance step for the first molded object is ended. A waiting time for moving the robot 200 from the placement position P41 to the taking-out position P11 occurs between the end of the second conveyance step for the first molded object and the start of the first conveyance step for the second molded object. Therefore, a timing at which the first conveyance step is started for the second molded object in the comparative example is later than a timing at which the first conveyance step is started for the second molded object in the present embodiment. As a result, a timing at which the molding step is started for the third molded object in the comparative example is later than a timing at which the molding step is started for the third molded object in the present embodiment.

According to the injection molding system 10 of the present embodiment described above, the control device 500 controls the injection molding machine 100, the robot 200, and the inspection device 300 to overlap the period during which the inspection step is performed for inspecting the first molded object and the period during which the molding step is performed for molding the second molded object, and overlap the period during which the inspection step is performed for inspecting the second molded object and the period during which the second conveyance step is performed for conveying the first molded object to the tray. Therefore, since the molding step for molding the third molded object can be started at an early stage, the cycle time can be shortened. In particular, in the present embodiment, the control device 500 controls the injection molding machine 100, the robot 200, and the inspection device 300 to overlap the period during which the molding step is performed for molding the third molded object and the period during which the second conveyance step is performed for conveying the first molded object from the inspection device 300 to the tray TR. Therefore, the cycle time can be reliably shortened.

In the present embodiment, the inspection device 300 is configured such that while the molded object placed on one of the first placement unit 320 and the second placement unit 330 is inspected by the inspection unit 310, the molded object can be delivered between the other one of the first placement unit 320 and the second placement unit 330 and the robot 200. Therefore, the inspection step for inspecting the second molded object and the second conveyance step for conveying the first molded object to the tray can be overlapped without providing a plurality of inspection units 310. In particular, in the present embodiment, the inspection device 300 is configured such that while the molded object by the inspection unit 310 is inspected at the first inspection position P32, it is possible to deliver the molded object between the robot 200 and the second placement unit 330 at the second delivery position P33 away from the first inspection position P32, and while the molded object by the inspection unit 310 is inspected at the second inspection position P34, it is possible to deliver the molded object between the robot 200 and the first placement unit 320 at the first delivery position P31 away from the second inspection position P34. Therefore, a possibility of collision between the inspection unit 310 and the robot 200 can be reduced.

In the present embodiment, a center of the taking-out position P11, a center of the first delivery position P31, the center of the placement position P41, and a center of the second delivery position P33 are disposed in this order from the +X direction to the −X direction. Therefore, a moving distance of the suction unit 250 in the X direction can be shortened as compared with the form in which the center of the taking-out position P11, the center of the first delivery position P31, the center of the second delivery position P33, and the center of the placement position P41 are disposed in this order from the +X direction to the −X direction.

In the present embodiment, the empty second tray TR2 can be moved from the discharge position P44 to the placement position P41 while the first tray TR1 on which the molded object is placed is moved from the placement position P41 to the discharge position P44 by the tray moving unit 400. Therefore, since the waiting time until the first tray TR1 disposed at the placement position P41 is replaced with the second tray TR2 can be shortened as compared with the form in which the first tray TR1 on which the molded object is placed is moved from the placement position P41 to the discharge position P44 and then the empty second tray TR2 is moved from the discharge position P94 to the placement position P41, the cycle time can be shortened. In particular, in the present embodiment, the empty second tray TR2 can be moved toward the placement position P41 while the first tray TR1 on which the first molded object is placed is taken out at the discharge position P44. Therefore, the taking-out of the first tray TR1 at the discharge position P44 and the placement of the second molded object on the second tray TR2 at the placement position P41 can be performed in parallel.

In present embodiment, according to the injection molding system of this form, the tray moving unit 400 is configured such that the discharge position P44, the first standby position P42, and the second standby position P43 are disposed in this order from the −X direction toward the +X direction, and the placement position P41 is disposed on the +Y direction side of the first standby position P42. Therefore, the tray can be moved efficiently in a space-saving work area.

In the present embodiment, the first tray TR1 on which the first molded object is placed and the second tray TR2 on which the second molded object is placed can be moved to the discharge position P44 protruding from the housing 50 by the tray discharging mechanism 405. Therefore, the first tray TR1 on which the first molded object is placed and the second tray TR2 on which the second molded object is placed can be easily taken out to the outside of the housing 50.

In the present embodiment, when an error occurs due to at least one of the operation of the injection molding machine 100 and the operation of the robot 200, the control device 500 causes both the injection molding machine 100 and the robot 200 to perform return operations. Therefore, regardless of whether the error is caused by the operation of the injection molding machine 100 or caused by the operation of the robot 200, the injection molding machine 100 and the robot 200 can be reliably returned from the error.

In the present embodiment, when an error occurs due to at least one of the operation of the injection molding machine 100 and the operation of the robot 200, the control device 500 starts the return operation of the robot 200 after the return operation of the injection molding machine 100 is ended. Therefore, the return operation of the injection molding machine 100 and the return operation of the robot 200 can be prevented from being performed in parallel, so that a possibility of collision between the injection molding machine 100 and the robot 200 can be reduced.

In the present embodiment, the control device 500 determines that an error occurs in the injection molding machine 100 in at least one of a case where an injection failure in which the molten material is not normally injected from the nozzle 155 is detected and a case where a mold clamping failure in which the mold unit 160 is not normally clamped is detected. Therefore, it is possible to eliminate the error of the injection molding machine 100 caused by the injection failure or the mold clamping failure.

In the present embodiment, the control device 500 determines that an error occurs in the robot 200 when a suction failure in which the molded object is not normally sucked in the suction unit 250 is detected. Therefore, it is possible to eliminate the error of the robot 200 caused by the suction failure.

In the present embodiment, the injection molding machine 100 and the tray moving unit 400 vertically overlap each other in the vertical direction. Therefore, the injection molding system 10 can be downsized in the horizontal direction.

In the present embodiment, the inspection device 300 and the tray moving unit 400 vertically overlap each other in the vertical direction. Therefore, the injection molding system 10 can be downsized in the horizontal direction.

In the present embodiment, the molded object can be pushed out from the movable mold 161 by the ejector pin 181 without changing an interval between the fixed mold 162 and the molded object MD. Therefore, since the position of the molded object MD is fixed when the suction unit 250 of the robot 200 sucks the molded object MD, the molded object MD can be easily sucked by the suction unit 250 of the robot 200.

In the present embodiment, the injection molding machine 100 melts the material using the flat screw 130 having a small height in the direction along the central axis RX. Therefore, since the injection molding machine 100 can be downsized, the injection molding system 10 can be downsized.

B. Other Embodiments (B1) In the injection molding system 10 according to the embodiment described above, the inspection device 300 is provided with the first inspection position P32 and the second inspection position P34, and the moving unit 340 reciprocates the inspection unit 310 between the first inspection position P32 and the second inspection position P34. In contrast, the first inspection position P32 and the second inspection position P34 may be provided at the same position in the inspection device 300. For example, one inspection position may be provided in the inspection device 300, and the inspection unit 310 may be fixed above the inspection position. In this case, the moving unit 340 is configured to reciprocate the first placement unit 320 between the first delivery position P31 and the inspection position, and to reciprocate the second placement unit 330 between the second delivery position P33 and the inspection position. In the inspection device 300, the first inspection position P32 and the first delivery position P31 may be provided at the same position, and the second inspection position P34 and the second delivery position P33 may be provided at the same position. In this case, the moving unit 340 is configured to move the inspection unit 310 between the first placement unit 320 and the second placement unit 330 without moving the first placement unit 320 and the second placement unit 330.

(B2) In the injection molding system 10 according to the above-described embodiment, the control device 500 starts the molding step for molding the second molded object by the injection molding machine 100 while the first molded object is placed on the first placement unit 320 or the second placement unit 330 of the inspection device 300. In contrast, the control device 500 may start the molding step for molding the second molded object by the injection molding machine 100 after the first molded object is taken out from the mold unit 160 by the robot 200 and before the first molded object is placed on the first placement unit 320 or the second placement unit 330 of the inspection device 300. In this case, the cycle time can be further shortened.

(B3) In the injection molding system 10 according to the embodiment described above, the center of the taking-out position P11, the center of the first delivery position P31, the center of the placement position P41, and the center of the second delivery position P33 are disposed in this order from the +X direction to the −X direction. In contrast, the center of the taking-out position P11, the center of the first delivery position P31, the center of the placement position P41, and the center of the second delivery position P33 may be disposed in an order different from that described above. For example, the center of the taking-out position P11, the center of the first delivery position P31, the center of the second delivery position P33, and the center of the placement position P41 may be disposed in this order from the +X direction to the −X direction.

(B4) In the injection molding system 10 according to the embodiment described above, the tray moving unit 400 includes the tray discharging mechanism 405 protruding to the outside of the housing 50, and the discharge position P44 is provided on the tray discharging mechanism 405 protruding from the housing 50. In contrast, the tray moving unit 400 may not include the tray discharging mechanism 405, and the discharge position P44 may be provided in the housing 50.

(B5) In the injection molding system 10 according to the embodiment described above, the tray moving unit 400 may be configured such that the discharge position P44, the first standby position P42, the placement position P41, and the second standby position P43 are disposed clockwise, and the first tray TR1 and the second tray TR2 are clockwise moved in the order of the discharge position P44, the first standby position P42, the placement position P41, and the second standby position P43. The tray moving unit 400 may be configured such that the discharge position P44, the first standby position P42, the placement position P41, and the second standby position P43 are disposed counterclockwise, and the first tray TR1 and the second tray TR2 are counterclockwise moved in the order of the discharge position P44, the first standby position P42, the placement position P41, and the second standby position P43.

(B6) In the injection molding system 10 according to the embodiment described above, when the control device 500 determines in step S270 of FIG. 13 that an error occurs in at least one of the injection molding machine 100 and the robot 200, the control device 500 starts the return operation of the robot 200 after the return operation of the injection molding machine 100 is ended. In contrast, when the control device 500 determines in step S270 that an error occurs in at least one of the injection molding machine 100 and the robot 200, the return operations of the injection molding machine 100 and the robot 200 may be executed to overlap a period during which the return operation of the injection molding machine 100 is performed and a period during which the return operation of the robot 200 is performed.

(B7) In the injection molding system 10 according to the embodiment described above, when it is determined in step S270 of FIG. 13 that an error occurs in at least one of the injection molding machine 100 and the robot 200, the control device 500 may cause the inspection device 300 to execute a return operation after the inspection of the molded object by the inspection device 300 is ended. In this case, it is possible to prevent the inspection of the molded object by the inspection device 300 from being interrupted, and the inspection of the molded object from being omitted.

(B8) In the injection molding system 10 according to the embodiment described above, when it is determined in step S270 of FIG. 13 that an error occurs in at least one of the injection molding machine 100 and the robot 200, the control device 500 may control the tray moving unit 400 to move the tray on which the molded object is placed to the discharge position P44. Therefore, since the tray on which the molded object is placed can be conveyed toward the discharge position P44 while the return operations of the injection molding machine 100 and the robot 200 are executed, it is possible to prevent the discharge of the molded object placed on the tray from being delayed before the occurrence of the error.

(B9) In the injection molding system 10 according to the embodiment described above, the tray moving unit 400 and at least a part of the injection molding machine 100 vertically overlap each other in the vertical direction. In contrast, the tray moving unit 400 and at least a part of a fixed portion between the robot 200 and the housing 50 may vertically overlap each other without vertically overlapping the injection molding machine 100 and the tray moving unit 400 in the vertical direction. The tray moving unit 400 and at least a part of the injection molding machine 100 may vertically overlap each other, and the tray moving unit 400 and at least a part of the fixed portion between the robot 200 and the housing 50 may vertically overlap each other in the vertical direction.

(B10) In the injection molding system 10 according to the embodiment described above, the tray moving unit 400 and at least a part of the inspection device 300 vertically overlap each other in the vertical direction. In contrast, the inspection device 300 and the tray moving unit 400 may not vertically overlap each other in the vertical direction.

(B11) In the injection molding system 10 according to the embodiment described above, the injection molding machine 100 is configured to move the movable mold 161 with respect to the fixed mold 162 and the ejector pin 181 without moving the ejector pin 181 with respect to the fixed mold 162 when the molded object MD is pushed out from the movable mold 161. In contrast, the injection molding machine 100 may be configured to move the ejector pin 181 with respect to the movable mold 161 and the fixed mold 162 when the molded object MD is pushed out from the movable mold 161.

(B12) In the injection molding system 10 according to the embodiment described above, the injection molding machine 100 includes the flat columnar flat screw 130 and the barrel 140 having a flat screw 142 facing surface. In contrast, the injection molding machine 100 may include a screw which has a long shaft-shaped outer shape and in which a spiral groove is formed on a side surface of a shaft, and a barrel having a cylindrical screw facing surface.

C. Other Aspects

The present disclosure is not limited to the above-described embodiments, and can be implemented in various aspects without departing from the spirit of the present disclosure. For example, the present disclosure can be implemented by the following aspects. In order to solve some or all of the problems described in the present disclosure, or to achieve some or all of the effects of the present disclosure, technical characteristics in the above embodiments corresponding to the technical characteristics in each of the embodiments described below can be appropriately replaced or combined. If the technical characteristics are not described as essential in the present description, they can be deleted as appropriate.

(1) According to one aspect of the present disclosure, an injection molding system is provided. The injection molding system includes: an injection molding machine configured to inject a molten material into a mold to mold a molded object; an inspection device including a first placement unit and a second placement unit on which the molded object is placed, an inspection unit configured to inspect the molded object, and a moving unit configured to change a relative position between the first placement unit and the inspection unit and a relative position between the second placement unit and the inspection unit; a third placement unit on which the molded object after inspection by the inspection device is placed; a robot configured to execute an operation of conveying the molded object from the mold to the first placement unit or the second placement unit, and an operation of conveying the molded object from the first placement unit or the second placement unit to the third placement unit; and a control device configured to control the injection molding machine, the robot, and the inspection device. The control device controls the injection molding machine, the robot, and the inspection device so as to mold, by the injection molding machine, a first molded object as the molded object during a first molding period, inspect, by the inspection unit, the first molded object placed on the first placement unit during a first inspection period, convey, by the robot, the first molded object after inspection from the first placement unit to the third placement unit during a first conveyance period, mold, by the injection molding machine, a second molded object that is the molded object during a second molding period after the first molding period, inspect, by the inspection unit, the second molded object placed on the second placement unit during a second inspection period, convey, by the robot, the second molded object after inspection from the second placement unit to the third placement unit during a second conveyance period, and overlap the first inspection period and the second molding period and overlap the second inspection period and the first conveyance period.

According to the injection molding system of this aspect, when the molded object placed on one of the first placement unit and the second placement unit is inspected, the molded object can be delivered to the other one of the first placement unit and the second placement unit. Therefore, the cycle time can be shortened.

(2) In the injection molding system of the above aspect, the inspection device may include a first delivery position and a second delivery position for delivering the molded object between the inspection device and the robot, and a first inspection position and a second inspection position for inspecting the molded object, and the moving unit may move the first placement unit between the first delivery position and the first inspection position, move the second placement unit between the second delivery position and the second inspection position, and move the inspection unit between the first inspection position and the second inspection position.

According to the injection molding system of this aspect, since the molded object can be delivered between the robot and the first placement unit or the second placement unit at a position away from the position where the molded object is inspected by the inspection unit, the possibility of collision between the inspection unit and the robot can be reduced.

(3) In the injection molding system of the above aspect, the mold, the first delivery position, the third placement unit, and the second delivery position may be disposed in this order in a direction from the first delivery position to the second delivery position.

According to the injection molding system of this aspect, a moving distance of the robot for conveying the molded object can be shortened.

(4) In the injection molding system of the above aspect, the control device may mold, by the injection molding machine, a third molded object as the molded object during a third molding period overlapping the first conveyance period.

According to the injection molding system of this aspect, the cycle time can be further shortened.

(5) In the injection molding system of the above aspect, the control device may control the injection molding machine to start molding the second molded object by the injection molding machine before the first molded object is placed on the first placement unit.

According to the injection molding system of this aspect, the cycle time can be further shortened.

(6) In the injection molding system of the above aspect, the mold of the injection molding machine may include a fixed mold, a movable mold moving with respect to the fixed mold, and an ejector pin protruding from the movable mold toward the fixed mold by a movement of the movable mold with respect to the fixed mold, and the robot may take out, by the ejector pin, the molded object pushed out from the movable mold.

According to the injection molding system of this aspect, since the molded object can be released from the movable mold without changing an interval between the fixed mold and the molded object, the molded object can be easily grasped by the robot when the molded object is taken out from the movable mold.

(7) In the injection molding system of the above aspect, the injection molding machine may include a nozzle configured to inject the molten material into the mold, a flat screw having a groove forming surface provided with a groove portion, a barrel having a communication hole facing the groove forming surface and communicating with the nozzle, and a heating unit, and by rotation of the flat screw and heating by the heating unit, a material supplied to the groove portion may be melted to generate the molten material, and then the molten material may flow out from the communication hole.

According to the injection molding system of this aspect, since the injection molding machine can be downsized, the injection molding system can be downsized.

The present disclosure may be implemented in various forms other than the injection molding system. For example, the present disclosure can be implemented in the form of a method for manufacturing a molded object.

What is claimed is:

1. An injection molding system comprising:
    an injection molding machine configured to inject a molten material into a mold to mold a molded object;
    an inspection device including a first placement unit and a second placement unit, an inspection unit configured to inspect the molded object individually placed on one of the first placement unit and the second placement unit, and a moving unit configured to switch between inspection at the first placement unit and inspection at the second placement unit by moving the inspection unit between a first inspection position and a second inspection position, and by reciprocating the first placement unit along a first direction between a first delivery position and the first inspection position to change a relative position between the first placement unit and the inspection unit and reciprocating the second placement unit along the first direction between a second delivery position and the second inspection position to change a relative position between the second placement unit and the inspection unit, the first inspection position and the second inspection position being aligned along a second direction orthogonal to the first direction;
    a third placement unit on which the molded object after inspection by the inspection device is placed on a tray;
    a robot configured to execute an operation of individually conveying the molded object molded by the injection molding machine from a taking-out position to the first placement unit or the second placement unit by switching between conveying to the first placement unit and conveying to the second placement unit, and an operation of individually conveying the molded object from the first placement unit or the second placement unit to the third placement unit by switching between conveying from the first placement unit and conveying from the second placement unit; and
    a control device configured to control the injection molding machine, the robot, and the inspection device, wherein
    the control device controls the injection molding machine, the robot, and the inspection device so as to
        mold, by the injection molding machine, a first molded object as the molded object during a first molding period,
        inspect, by the inspection unit, the first molded object individually placed on the first placement unit during a first inspection period,
        individually convey, by the robot, the first molded object after inspection from the first placement unit to the third placement unit during a first conveyance period,
        mold, by the injection molding machine, a second molded object as the molded object during a second molding period after the first molding period,
        inspect, by the inspection unit, the second molded object individually placed on the second placement unit during a second inspection period,
        individually convey, by the robot, the second molded object after inspection from the second placement unit to the third placement unit during a second conveyance period, and
        overlap the first inspection period and the second molding period and overlap the second inspection period and the first conveyance period, and
    a center of the taking-out position, a center of the third placement unit, a center of the first delivery position and a center of the second delivery position are arranged in this order with respect to the second direction.

2. The injection molding system according to claim 1, wherein
    the mold, the first delivery position, the third placement unit, and the second delivery position are disposed in this order in a direction from the first delivery position to the second delivery position.

3. The injection molding system according to claim 1, wherein
    the control device molds, by the injection molding machine, a third molded object as the molded object during a third molding period overlapping the first conveyance period.

4. The injection molding system according to claim 1, wherein
    the control device controls the injection molding machine to start molding the second molded object by the injection molding machine before the first molded object is placed on the first placement unit.

5. The injection molding system according to claim 1, wherein
    the mold of the injection molding machine includes a fixed mold, a movable mold moving with respect to the fixed mold, and an ejector pin protruding from the movable mold toward the fixed mold by a movement of the movable mold with respect to the fixed mold, and
    the robot takes out, by the ejector pin, the molded object pushed out from the movable mold.

6. The injection molding system according to claim 1, wherein
    the injection molding machine includes
        a nozzle configured to inject the molten material into the mold,
        a flat screw having a groove forming surface provided with a groove portion,
        a barrel having a communication hole facing the groove forming surface and communicating with the nozzle, and
        a heating unit, and
        by rotation of the flat screw and heating by the heating unit, a material supplied to the groove portion is melted to generate the molten material, and then the molten material flows out from the communication hole.

* * * * *